US010764026B2

(12) United States Patent
Sharpe-Geisler

(10) Patent No.: US 10,764,026 B2
(45) Date of Patent: Sep. 1, 2020

(54) ACOUSTIC GESTURE RECOGNITION SYSTEMS AND METHODS

(71) Applicant: Lattice Semiconductor Corporation, Hillsboro, OR (US)

(72) Inventor: Bradley Sharpe-Geisler, San Jose, CA (US)

(73) Assignee: LATTICE SEMICONDUCTOR CORPORATION, Hillsboro, OR (US)

( * ) Notice: Subject to any disclaimer, the term of this patent is extended or adjusted under 35 U.S.C. 154(b) by 621 days.

(21) Appl. No.: 15/331,736

(22) Filed: Oct. 21, 2016

(65) Prior Publication Data
US 2017/0041127 A1 Feb. 9, 2017

Related U.S. Application Data

(63) Continuation-in-part of application No. PCT/US2016/042827, filed on Jul. 18, 2016.

(60) Provisional application No. 62/244,333, filed on Oct. 21, 2015, provisional application No. 62/194,733, filed on Jul. 20, 2015, provisional application No. 62/208,041, filed on Aug. 21, 2015, provisional
(Continued)

(51) Int. Cl.
*H04L 7/00* (2006.01)
*G01S 15/46* (2006.01)
*G01S 15/87* (2006.01)
*G01S 15/89* (2006.01)

(52) U.S. Cl.
CPC ............ *H04L 7/0012* (2013.01); *G01S 15/46* (2013.01); *G01S 15/87* (2013.01); *H04L 7/0033* (2013.01); *G01S 15/89* (2013.01)

(58) Field of Classification Search
CPC ....... H04L 7/00; H04L 7/0012; H04L 7/0033; G01S 15/04; G01S 15/46; G01S 15/87; G01S 15/89
See application file for complete search history.

(56) References Cited

U.S. PATENT DOCUMENTS 3,118,055 A * 1/1964 Bensky .................. G06F 15/78
708/604
5,977,913 A * 11/1999 Christ .................. G01C 21/206
340/524
(Continued)

FOREIGN PATENT DOCUMENTS

EP         2680467          1/2014

*Primary Examiner* — Hovhannes Baghdasaryan
*Assistant Examiner* — Amie M Ndure
(74) *Attorney, Agent, or Firm* — Haynes and Boone, LLP

(57) ABSTRACT

Methods and circuitry for relatively low-speed bus time stamping and triggering for use in acoustic object and gesture detection and recognition are presented in this disclosure. A master device and slave devices can be interfaced via a communication link that includes a data line and a clock line. The master device generates and controls a clock signal on the clock line and sends a synchronization command over the data line to the slave devices. The master device receives timestamp and/or other information corresponding to events detected at each slave device, such as a detected acoustic wave reflected from an object. The master device tracks transitions and frequencies of the clock signal, and determines a time of the event based on the timestamp information, the tracked transitions and the frequencies. The master device can use the event times to derive positions and gestures associated with detected objects.

20 Claims, 25 Drawing Sheets

Related U.S. Application Data application No. 62/209,999, filed on Aug. 26, 2015, provisional application No. 62/217,180, filed on Sep. 11, 2015.

(56) References Cited

U.S. PATENT DOCUMENTS

| | | |
|---|---|---|
| 9,042,274 B2 | 5/2015 | Peichl et al. |
| 2007/0159924 A1* | 7/2007 | Vook .................. G01S 5/28 367/127 |
| 2009/0013114 A1* | 1/2009 | Sanders ............. G06F 13/4278 710/110 |
| 2010/0081451 A1* | 4/2010 | Mueck ................ G01S 5/0045 455/456.1 |
| 2011/0019698 A1* | 1/2011 | Akae .................... H04J 3/0664 370/509 |
| 2013/0223577 A1 | 8/2013 | Xu et al. |
| 2014/0351359 A1 | 11/2014 | Grocutt et al. |

* cited by examiner

1500

Receive, via a communication link that carries a clock signal, a synchronization command and delay setting information
1502

Track a number of selected transitions of the clock signal after the synchronization command
1504

Generate a trigger signal responsive to the number of selected transitions reaching a delay setting indicated by the delay setting information
1506

```
┌─────────────────────────────────────┐
│   Transmit, from a master device via a │
│   communication link, a clock signal and a │
│        synchronization command       │
│                 1602                 │
└─────────────────────────────────────┘
                  ▼
┌─────────────────────────────────────┐
│  Transmit, via the communication link, delay setting │
│     information indicating a number of selected │
│    transitions of the clock signal that are to occur │
│      between the synchronization command and │
│  generation of a trigger signal at one or more slave │
│      devices coupled to the communication link │
│                 1604                 │
└─────────────────────────────────────┘
```

FIG. 16

ACOUSTIC GESTURE RECOGNITION SYSTEMS AND METHODS

CROSS REFERENCE TO RELATED APPLICATIONS

This application claims the benefit of U.S. Provisional Patent Application No. 62/244,333, filed Oct. 21, 2015, which is hereby incorporated by reference in its entirety.

This application is also a continuation-in-part of International Patent Application No. PCT/US2016/042827, filed Jul. 18, 2016, which is hereby incorporated by reference in its entirety. International Patent Application No. PCT/US2016/042827 claims the benefit of U.S. Provisional Patent Application No. 62/194,733, filed Jul. 20, 2015, U.S. Provisional Patent Application No. 62/208,041, filed Aug. 21, 2015, U.S. Provisional Patent Application No. 62/209,999, filed Aug. 26, 2015, and U.S. Provisional Patent Application No. 62/217,180, filed Sep. 11, 2015, which are all hereby incorporated by reference in their entirety.

BACKGROUND

The present disclosure generally relates to a relatively low-speed bus message protocol, and more particularly relates to methods and circuitry for acoustic object and/or gesture detection and/or recognition using relatively low-speed bus time stamping and triggering.

The Inter-Integrated Circuit (I2C) interface is typically used for attaching lower-speed peripheral Integrated Circuits (ICs) to higher-speed processors and microcontrollers. Lower-speed peripheral ICs are commonly referred to as slave devices, whereas a higher-speed processor or microcontroller is commonly referred to as a master device. Often, a slave device can be coupled to a peripheral device such as a sensor, a gyroscope, a compass, a microphone, and the like. The slave device can be configured to monitor and/or control operations of the peripheral device coupled to the slave device.

In the I2C message protocol, a simultaneous operation by two or more slave devices can utilize a common trigger signal (e.g., generated by a master device), which is provided independent of an I2C low-speed serial bus. Similarly, in order to determine when an event occurred (e.g., a measurement performed by a peripheral device coupled to a slave device), each slave device uses a dedicated line or trace feeding back to the master device for signaling to the master device a time when the event occurs. For each slave device, the master device can capture a state of a real time clock (i.e., time of event, or timestamp of event) when the master device receives an event marker signal from the slave device over the separate dedicated line. The disadvantage of this approach is a number of additional communication lines (i.e., board traces) between the master device and the slave devices, and the additional signal pins that are required.

SUMMARY

Certain embodiments of the present disclosure provide a system. The system generally includes a master device coupled to a communication link, the master device to transmit, via the communication link, a clock signal and a synchronization command, and one or more slave devices coupled to the communication link, each slave device to track a number of selected transitions of the clock signal between the synchronization command and an event detected at that slave device, and generate information about an elapsed time between the synchronization command and the event detected at that slave device, the information based on the number of selected transitions of the clock signal tracked at that slave device, and wherein the master device to obtain the information about the elapsed time and to derive a time the event was detected at that slave device.

Certain embodiments of the present disclosure provide an apparatus. The apparatus generally includes an interface circuit for coupling to a communication link, the interface circuit to transmit, via the communication link, a clock signal and a synchronization command, and receive, via the communication link, timestamp information indicative of a number of selected transitions of the clock signal that elapse between the synchronization command and a time instant when an event is detected at a slave device, a time tracking circuit to track counts of selected transitions of the clock signal between the synchronization command and frequency changes of the clock signal occurring after the synchronization command, and a time calculation circuit to determine a time of the event detected at the slave device based on the timestamp information and the counts of the selected transitions of the clock signal.

Certain embodiments of the present disclosure provide an apparatus. The apparatus generally includes an interface circuit for coupling to a communication link that carries a clock signal, and a control circuit to track a number of selected transitions of the clock signal on the communication link between a synchronization command received via the communication link and a detection of an event, the interface circuit to transmit, via the communication link, information about an elapsed time between the synchronization command and the detection of the event, the information based on the number of selected transitions of the clock signal.

Certain embodiments of the present disclosure provide a method. The method generally includes generating a clock signal and a synchronization command, transmitting, via a communication link, the clock signal and the synchronization command, receiving, via the communication link, timestamp information indicative of a number of selected transitions of the clock signal that elapse between the synchronization command and a time instant when an event is detected at a slave device, tracking counts of selected transitions of the clock signal between the synchronization command and frequency changes of the clock signal occurring after the synchronization command, and determining a time of the event detected at the slave device based on the timestamp information and the counts of the selected transitions of the clock signal.

Certain embodiments of the present disclosure provide an apparatus. The apparatus generally includes an interface for coupling to a communication link that carries a clock signal, the interface to receive via the communication link a synchronization command and first delay setting information, and a control circuit to track a number of selected transitions of the clock signal after the synchronization command and to generate a trigger signal responsive to the number of selected transitions reaching a delay setting indicated by the first delay setting information.

Certain embodiments of the present disclosure provide a method. The method generally includes receiving, via a communication link that carries a clock signal, a synchronization command and first delay setting information, tracking a number of selected transitions of the clock signal after the synchronization command, and generating a trigger signal responsive to the number of selected transitions reaching a delay setting indicated by the first delay setting information.

Certain embodiments of the present disclosure provide an apparatus. The apparatus generally includes an interface circuit for coupling to a communication link, the interface circuit to transmit, via the communication link, a clock signal and a synchronization command, and transmit, via the communication link, delay setting information indicating a number of selected transitions of the clock signal that are to occur between the synchronization command and generation of a trigger signal at one or more slave devices coupled to the communication link.

Certain embodiments of the present disclosure provide a method. The method generally includes transmitting, from a master device via a communication link, a clock signal and a synchronization command, and transmitting, via the communication link, delay setting information indicating a number of selected transitions of the clock signal that are to occur between the synchronization command and generation of a trigger signal at one or more slave devices coupled to the communication link.

BRIEF DESCRIPTION OF THE DRAWINGS

FIG. 15 is a flow chart illustrating a method for delayed triggering that may be performed at a slave device, in accordance with embodiments of the present disclosure.

FIG. 16 is a flow chart illustrating a method for delayed triggering that may be performed at a master device, in accordance with embodiments of the present disclosure.

Figure 1:
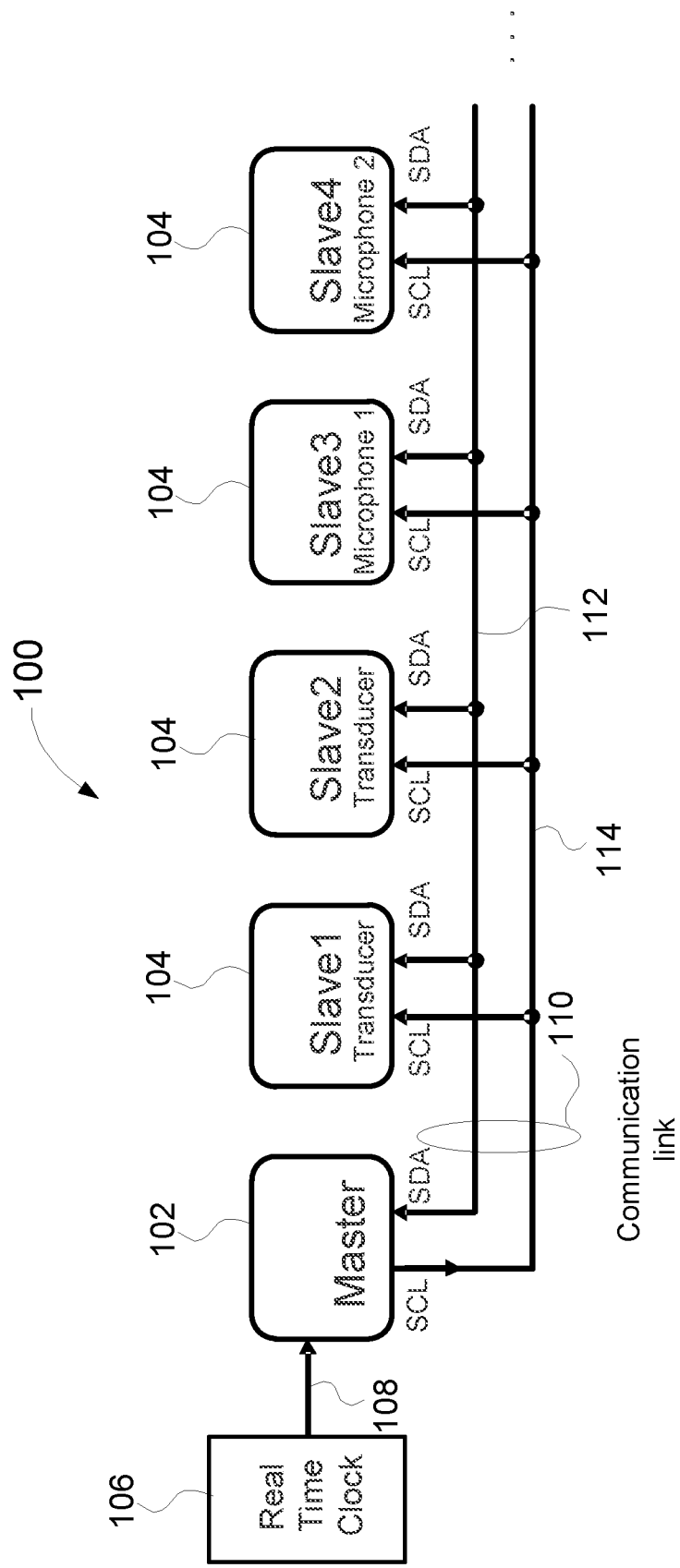
FIG. 1 is a schematic diagram that illustrates I3C master device interfaced with multiple slave devices via I3C based communication link, in accordance with embodiments of the present disclosure.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure relate to synchronizing multiple slave devices operating in conjunction with a master device in accordance with a messaging protocol, such as the I3C message protocol, which is an enhanced version of the Inter-Integrated Circuit (I2C) message protocol. Synchronization of multiple slave devices presented herein can provide accurate time stamping of events detected at the slave devices, as well as efficient initiation of delayed triggered events at the multiple slave devices.

Certain embodiments of the present disclosure support initiating simultaneous readings/operations of peripheral devices coupled to the slave devices. For example, methods and circuitry presented herein can synchronize measurements between a gyroscope and a magnetic compass (that are coupled to a pair of slave devices), while both the gyroscope and the magnetic compass are located on a rotating object. The methods and circuitry presented in this disclosure can also initiate delay triggered events on multiple slave devices, which can be useful for tomography.

In accordance with embodiments of the present disclosure, multiple slave devices can initiate simultaneous operations (e.g., measurements) via I3C time synchronization triggering, as discussed in more detail below. In this way, the need for side channels to synchronize events can be eliminated. There is no concern for time units or local clock signals since all slave devices can be triggered simultaneously. More generally, embodiments of the present disclosure support usage of a time synchronization command that starts a timer at each slave device that triggers an event at an end of a pre-determined time period. A time delay for a triggering event at each slave device can be set by a directed command that may precede the time synchronization command.

In the illustrative embodiment of the present disclosure, cell-phone based tomography can be considered. Each slave device may drive one transducer of an array of transducers (e.g., located at a back of a cellular phone), wherein the transducer generates an acoustic pulse (e.g., based on a trigger signal from the slave device) at the end of the aforementioned individual time delay interval (e.g., to control phase for beam-forming). Shortly thereafter, each transducer may receive a reflected waveform, wherein each feature of the reflected waveform (e.g., that is within a preset time aperture and within a present magnitude/derivative/ second derivative limits, as defined by an earlier command) can be time-stamped, which is recorded in a register at the slave device. The master device may then poll each slave device and read back the stored time-stamped data. For example, after a certain number of triggering/time-stamping operations, there is sufficient operation to make an image of an interior of abdomen (or some other internal organ).

In accordance with embodiments of the present disclosure, independent clock signals and counter circuits in different slave devices can be synchronized that are used to time-stamp their readings. In this way, events from different sensors can be accurately correlated in time. For example, a plurality of measurements produced by an array of I3C microphones can be correlated to determine a direction from which a sound (e.g., "clap") originates, wherein each microphone in the array can have its own clock signal.

Embodiments of the present disclosure support utilizing a new common command code (CCC) serial bus command. i.e., "Time Sync" command for time synchronization. In some embodiments, a master device may issue Time Sync CCC to synchronize all slave devices to a particular selected transition (e.g., falling edge) of a clock signal driving a Serial Clock Line (SCL) bus. Each slave device may be configured to count all selected transitions of SCL signal after Time Sync CCC is detected, and may use selected transitions of SCL clock signal as time markers for time-stamping events. The master device may count all selected transitions of SCL clock signal after detecting Time Sync CCC while also monitoring a period of transitions of SCL clock signal against a (stable) time base. The master device may also monitor bus traffic for time-stamp data, collect the time-stamp data and perform calculations to determine timing of events (e.g., sensor measurements) detected at the slave devices against the time base. In other embodiments a monitor device separate from the master device may perform the counting of SCL transitions and collection of time stamped data.

Embodiments of the present disclosure facilitate accurate time-stamping and triggering. In one or more embodiments, for time-stamping, a slave device may monitor a sensor and record a time (count) that a sensed event occurs. In one or more other embodiments, for triggering, a master device may issue a command for all slave devices in a group to initiate certain operations at a precise time (count). It should be noted that this may be initiation of a time-delay after which an action occurs, wherein the time-delay may be preset to different delay values on a per slave device basis.

FIG. 1 is a schematic diagram 100 that illustrates a master device 102 interfaced with multiple slave devices 104, in accordance with embodiments of the present disclosure. In one or more embodiments, each slave device 104 may be a lower-speed peripheral integrated circuit (IC), whereas the master device 102 may be a higher-speed processor or microcontroller. In an embodiment, the master device 102 may be coupled to a real time clock source 106 that generates a clock signal 108 for the master device 102. In another embodiment, the master device 102 may comprise an internal clock signal source for generating a clock signal.

As illustrated in FIG. 1, the master device 102 may be interfaced with the slave devices 104 via communication link 110. In some embodiments, the communication link 110 is a two wire communication link that comprises a serial data line (SDA) bus 112 and SCL bus 114. SDA bus 112 is a single wire bus that may be employed to carry commands and/or data between the master device 102 and the slave devices 104 using single ended signals in accordance with a communication protocol such as I3C. SCL bus 114 is a single wire bus that may be utilized to carry a single-ended clock signal (e.g., the clock signal 108) that may be generated and/or controlled by the master device 102. Clock signal 108 is used as a timing reference for transmitting and receiving commands and/or data on the SDA bus 112. Each slave device 104 may be coupled to a peripheral device (e.g., transducer, microphone, sensor, and the like) controlled by that slave device 104.

For some embodiments, as discussed in more detail below, the master device 102 may issue a time synchronization command via SDA bus 112 to synchronize local counts of selected transitions of clock signals (e.g., falling edges of clock signals) in different slave devices 104 in order to accurately time-stamp readings (events) from devices (e.g., sensors) coupled to the slave devices 104. The time-stamped events locally stored at each slave device 104 may be provided (e.g., via SDA bus 112) to the master device 102 for calculation of a real time occurrence of each event, wherein a global real time can be accurately tracked by the master device 102 based on transitions of the clock signal 108 (e.g., signal carried by SCL bus 114). In this way, events (e.g., measurements) from different sensors coupled to different slave devices 104 can be accurately correlated in time at the master device 102.

For some other embodiments, as discussed in more detail below, multiple slave devices 104 can initiate synchronized operations (e.g., measurements) via time synchronization triggering controlled by the master device 102 (e.g., by sending an appropriate command via SDA bus 112). Thus, the need for side communication channels between the master device 102 and the slave devices 104 for synchronization of operations (events) can be eliminated.

Figure 2:
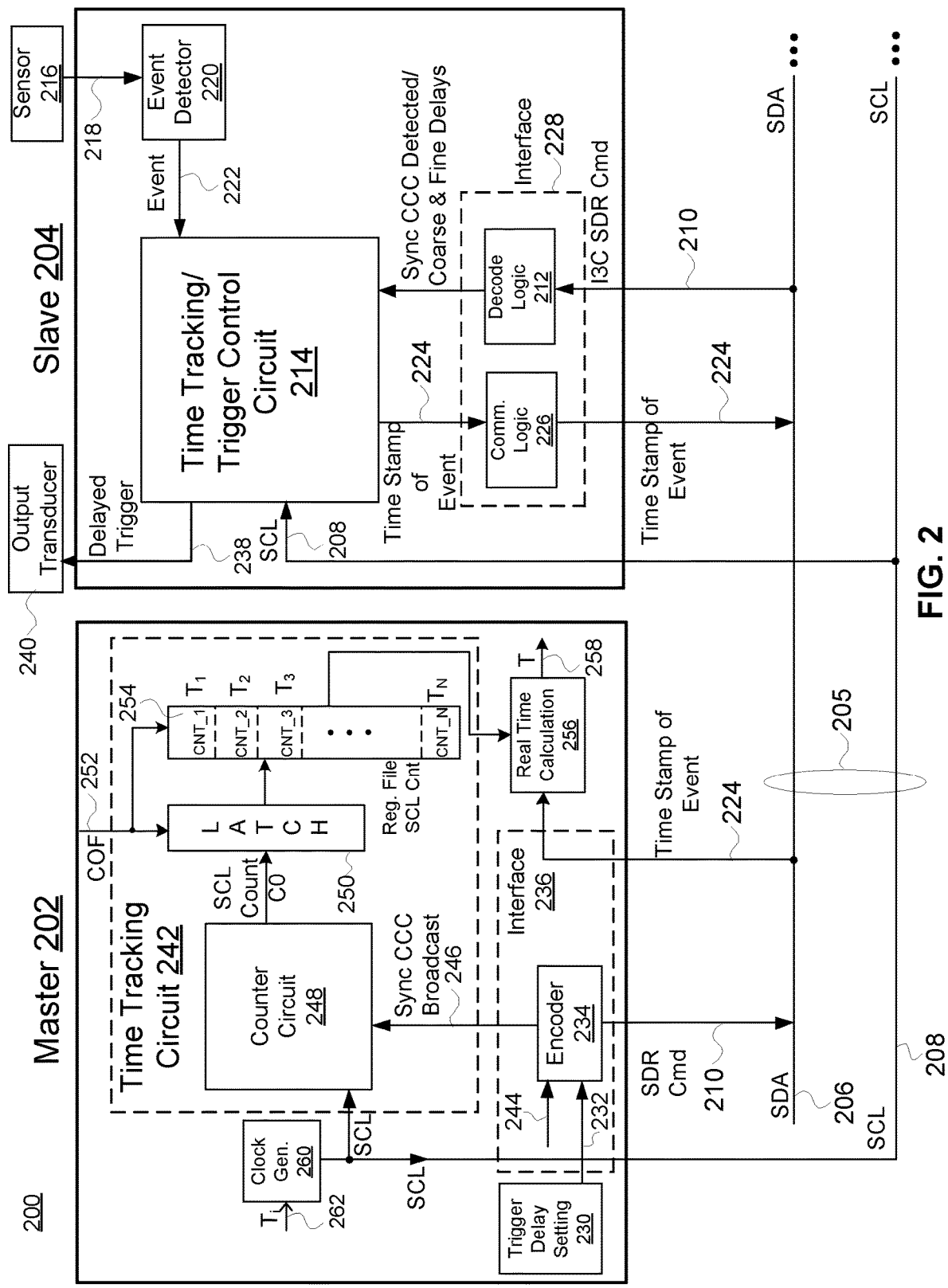
FIG. 2 is a schematic diagram of a system comprising a master device interfaced with a slave device via I3C based communication link for enabling time stamping and delayed triggering, in accordance with embodiments of the present disclosure.

FIG. 2 is a schematic diagram of a system 200 comprising a master device 202 interfaced with a slave device 204 via a communication link 205, which may enable time stamping and delayed triggering, in accordance with embodiments of the present disclosure. For some embodiments, the master device 202 may correspond to the master device 102 shown in FIG. 1, and the slave device 204 may correspond to any of the slave devices 104 shown in FIG. 1. Although one slave device 204 is illustrated in FIG. 2, embodiments of the present disclosure support interfacing multiple slave devices 204 to the master device 202. As illustrated in FIG. 2, the communication link 205 may comprise SDA bus 206 and SCL bus 208. As further illustrated in FIG. 2, the master device 202 and the slave device 204 may both drive SDA bus 206, whereas only the master device 202 may provide and control a clock signal that may be carried by SCL bus 208 (hereinafter referred as SCL clock signal 208). The slave device 204 may communicate with the master device 202 via SDA bus 206, and the slave device 204 may utilize SCL clock signal 208 for time-stamping of an event detected by the slave device 204 and/or for synchronized delayed triggering, as discussed in more detail below.

In some embodiments, the master device 204 may broadcast via SDA bus 206 a Single Data Rate (SDR) command 210 to the slave device 204. In one or more embodiments, the SDR command 210 may comprise a Time Sync CCC. Upon decoding of the SDR command 210 (e.g., by decode logic 212), the slave device 204 may operate in accordance with the decoded SDR command 210. In an embodiment, Time Sync CCC may be detected at a Time Tracking/Trigger Control circuit 214. Based on the detected Time Sync CCC, a Time Sync Marker (not shown) may be generated by the Time Tracking/Trigger Control circuit 214 for start of time synchronization and time tracking until an event occurs and is detected, as discussed in more detail below. As illustrated in FIG. 2, the slave device 204 may be coupled to a sensor 216 that generates a sensor output signal 218 indicative of a measurement of an environmental property. An event detector circuit 220 detects occurrence of an event from the sensor output signal 218, and generates an event detection signal 222 that switches from a low logic level to a high logic level when the event is detected.

In some embodiments, the Time Tracking/Trigger Control circuit 214 may be configured to time-stamp occurrence of the event (e.g., sensor measurement) 222 with reference to the start of time synchronization, which may be indicated by the Time Sync Marker (not shown). As discussed in more detail below, the Time Tracking/Trigger Control circuit 214 may perform time-stamping of the event 222 based at least in part on selected transitions of SCL clock signal 208 (i.e., reference clock signal) that may be generated and controlled by the master device 202. The Time Tracking/Trigger Control circuit 214 may store a time stamp 224 of the event 222. As illustrated in FIG. 2 and discussed in more detail below, a communication logic 226 may read a value of the time stamp 224 and provide the time stamp value 224 to SDA bus 206 (e.g., when SDA bus 206 is free from other traffic). As further illustrated in FIG. 2, the communication logic 226 and the decode logic 212 represent an interface 228 that couples the slave device 204 to SDA bus 206.

In some embodiments, prior to broadcasting the SDR command 210 with Time Sync CCC, the master device 202 may communicate (e.g., via SDA bus 206) other SDR command(s) to the slave device 204 with delay setting information that determines a time delay for generating a trigger signal by the slave device 204. As illustrated in FIG. 2, a trigger delay setting circuit 230 generates delay setting information 232, which indicates a trigger delay in the form of a number of selected transitions of SCL clock signal 208 that are to occur between the SDR command 210 with the Time Sync CCC and generation of the trigger signal at the slave device 204. In an embodiment, the trigger delay setting circuit 230 generates delay setting information 232 based on expected frequency changes of SCL clock signal 208 that are to occur after the SDR command 210 with the Time Sync CCC. Information about the expected frequency changes of SCL clock signal 208 are known at the master device 202. An encoder 234 of a master device communication interface 236 encodes the delay setting information 232 within the SDR command 210. The SDR command 210 with the encoded delay setting information 232 is then broadcast via SDA bus 206 to one or more slave devices 204 to initiate delayed trigger. As further illustrated in FIG. 2, once the decode logic 212 of the slave device 204 decodes the delay setting information provided by the master device 202 within the SDR command 210 (e.g., coarse and fine delay settings) followed by the detection of Time Sync CCC encoded in another SDR command 210, the Time Tracking/Trigger Control circuit 214 may be configured to generate a delayed trigger signal 238 with a time delay determined based on the provided delay setting information, as discussed in more detail below. In an embodiment, the delayed trigger signal 238 may initiate operation (e.g., measurement) of a peripheral device coupled to the slave device 204, e.g., operation of an output transducer 240 coupled to the slave device 204.

In some embodiments, a time tracking circuit 242 of the master device 202 illustrated in FIG. 2 may be configured to track real time starting from a Time Sync Marker generated upon Sync signal 244. The encoder 234 encodes Sync signal 244 to generate the SDR command 210 with Time Sync CCC, which may be then broadcast via SDA bus 206 to one or more slave devices 204 to initiate time synchronization. Sync CCC broadcast 246 (i.e., Time Sync CCC) may be also detected within the Time Tracking circuit 242, which may then generate the Time Sync Marker that indicates a start of tracking a system reference time at the master device 202 based on tracking a number of selected transitions of SLC clock signal 208.

In some embodiments, a counter circuit 248 within the Time Tracking circuit 242 may be configured to keep track of the number of selected transitions (e.g., falling edges) of SCL clock signal 208. For each frequency of SCL clock signal 208, a number of selected transitions of SCL signal 208 (e.g., denoted in FIG. 2 as SCL count C0) may be saved into a latch 250, which may be controlled by a change of frequency (COF) signal 252. As discussed in more detail below, SCL count C0 may represent a number of selected transitions of SCL clock signal 208 between the Time Sync Marker and a last selected transition (e.g., falling edge) of SCL clock signal 208 prior to a change of frequency of SCL clock signal 208. After every change of frequency of SCL clock signal 208, an updated SCL count C0 may be stored in the latch 250, which is controlled by COF signal 252. The updated SCL count C0 may indicate a number of selected transitions of SCL clock signal 208 between the Time Sync Marker and a last selected transition of SCL clock signal 208 prior to a change of frequency of SCL clock signal 208. Upon every change of frequency of SCL clock signal 208 and based on corresponding COF signal 252, a previous (old) value of SCL count C0 may be also saved in a register file (e.g., look-up table) 254. Thus, the register file 254 may include different values of SCL count C0 (e.g., values CNT_1, CNT_2, . . . , CNT_N) that correspond to N different frequencies of SCL clock signal 208. Each value CNT_i stored in the register file 254 may be also associated with a value Ti that encodes a period of each frequency of SCL clock signal 208. Therefore, values of CNT_i and Ti (i=1, . . . , N) stored in the register file 254 may provide information about a system reference time from the Time Sync Marker.

In some embodiments, the master device 202 may receive, via SDA bus 206, information about the time stamp 224 of the event 222 detected at the slave device 204. The master device 202 may use information stored in the register file 254 about the system reference time tracked from initiation of the Time Sync Marker to correlate it with the time stamp 224 (e.g., at real time calculation circuit 256) to determine an exact global (system) time 258 of occurrence of the event 222. The calculated time 258 represents a global time that is measured based on selected transitions of SCL clock signal 208 starting from initiation of the Time Sync Marker at the master device 202. In an embodiment, SCL clock signal 208 may be generated at the master device 202 by an adjustable clock generator 260, which may provide a frequency of SCL clock signal 208 based on indication 262 (e.g., indication Ti) about a desired period of SCL clock signal 208.

Figure 3:
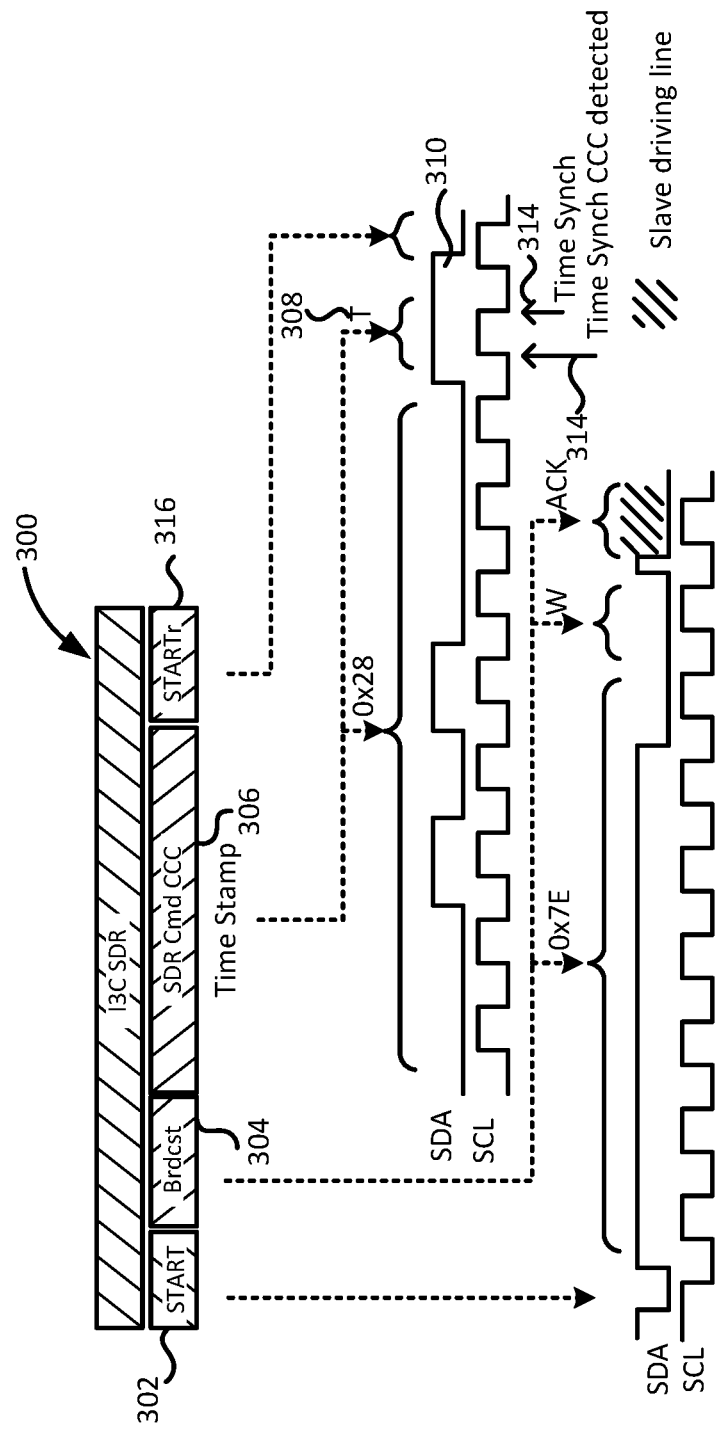
FIG. 3 illustrates an example time stamp synchronization command and waveforms of signals driving I3C serial buses in relation to the time stamp synchronization command, in accordance with embodiments of the present disclosure.

As discussed above, embodiments of the present disclosure support adding a new Time Stamp Sync CCC broadcast command into a message protocol. The master device 202 may issue Time Stamp Sync command via SDA bus 206 to synchronize one or more slave devices 204 coupled to SDA bus 206 to a particular selected transition (e.g., falling edge) of a clock signal driving SCL bus. FIG. 3 illustrates an example Time Stamp Sync command 300 and waveforms of signals driving SDA and SCL buses in relation to the Time Stamp Sync command 300, in accordance with embodiments of the present disclosure. Time Stamp Sync command 300 may be initiated by the master device 202 and broadcast to one more slave devices 204 via SDA bus 206. As illustrated in FIG. 3, a start portion 302 of Time Stamp Sync command 300 may be followed by a Broadcast portion 304 indicated with value 0x7E). Towards the end of the Broadcast portion 304, the master device may signal a write operation ('W') to the slave device(s), wherein at least one slave device may respond to the write operation ('W') on SDA bus with an Acknowledgement (ACK), to acknowledge reception of the Broadcast portion 304 of Time Stamp Sync command 300.

As illustrated in FIG. 3, SDR command CCC portion 306 of Time Stamp Sync command 300 may follow the Broadcast portion 304. Command code 0x28 corresponds to a Time Stamp Sync command. A portion 308 (e.g., 'T' bit) may be associated with a specific signal waveform 310 on SDA bus. During bit of Time Stamp Sync command 300, on a first selected transition (e.g., rising edge) of SCL clock signal, the slave device 204 may detect Time Sync CCC 312. The next selected transition (e.g., falling edge) of SCL clock signal may represent a Time Sync Marker 314, which is also detected at the slave device 204. As discussed in more detail below, the Time Sync Marker 314 may represent a time instant when synchronization of one or more slave devices 204 with a system reference time base produced by the master device 202 starts. As further illustrated in FIG. 3, Time Stamp Sync command 300 may end with a portion 316 that initiates reading of data from the slave devices 204 via SDA bus.

In some embodiments, as discussed in more detail below, the Time Sync Marker 314 provides a means for multiple slave devices to synchronize for timestamping events. The Time Sync Marker 314 also allows multiple slave devices to initiate simultaneous operations (e.g., measurements) via Time Sync Triggering. As a result, the need for side channels between a master device and slave devices to synchronize events can be eliminated. It should be noted that in the triggering case there is no concern for time units or local clocks since all slave devices are triggered simultaneously.

In some other embodiments, time-stamping of an event detected at a slave device may be supported based on the Time Sync Marker 314. As discussed in more detail below, a control circuit within the slave device may be initialized based on the Time Sync Marker 314, and may be configured to track a number of selected transitions of SCL clock signal. Once an event is detected, the number of tracked selected transitions of SCL clock signal may be saved in a slave device's local memory to be read back by a master device at a later time. The master device, which generates and controls the SCL clock signal, may also keep track of a number of selected transitions of the SCL clock signal, and may correlate its count with the saved time stamp count read back from the slave device in order to determine a global system time of occurrence of the event.

Figure 4:
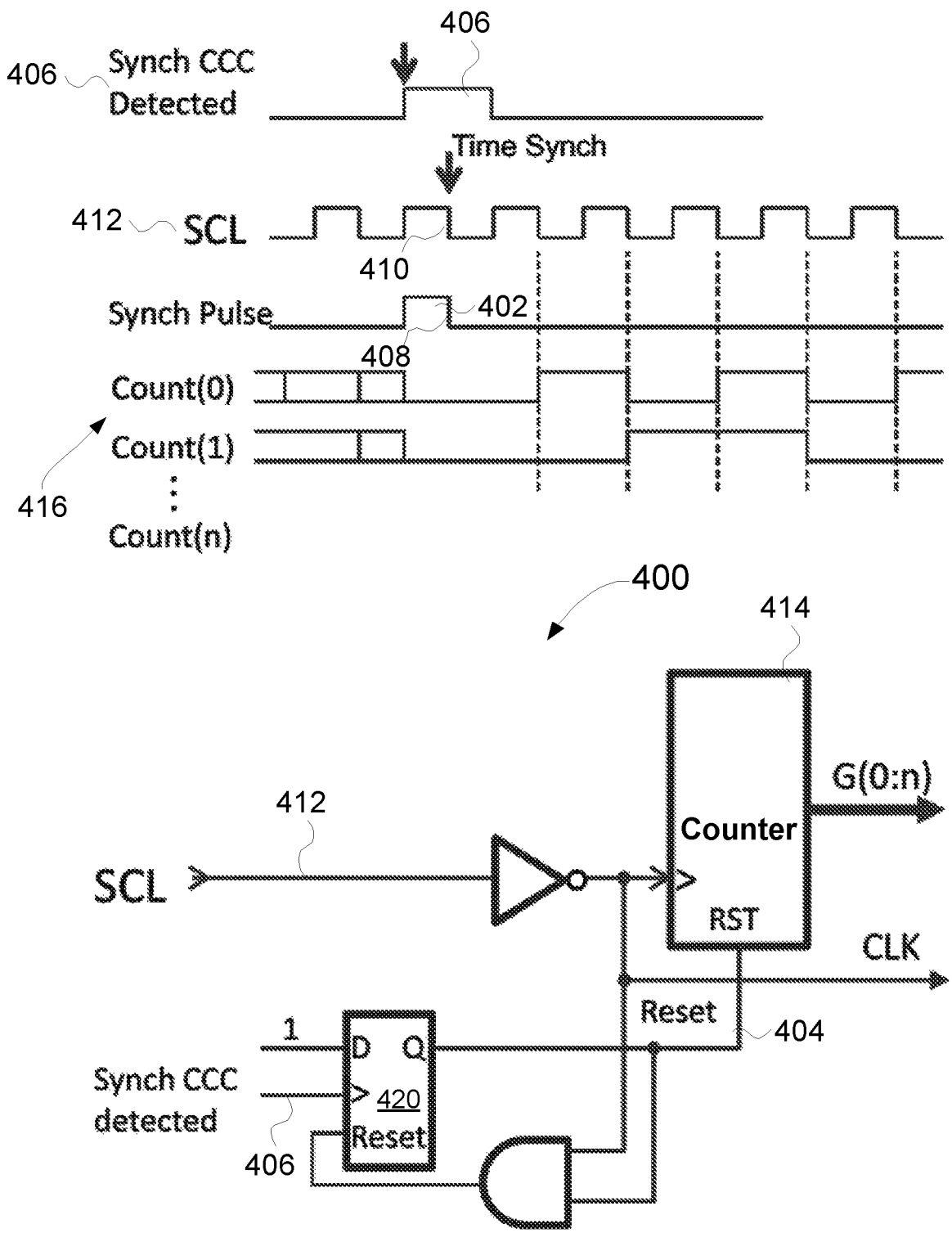
FIG. 4 is an example schematic of circuitry for implementing time synchronization at a slave device, in accordance with embodiments of the present disclosure.

FIG. 4 is an example schematic of circuitry 400 for implementing time synchronization at a slave device, such as slave device 204, in accordance with embodiments of the present disclosure. In some embodiments, the circuitry 400 may be a part of the Time Tracking/Trigger Control circuit 214 illustrated in FIG. 2. A flip flop 420 outputs a sync pulse 402 onto reset line 404 when (Time) Sync CCC is detected, i.e., when the rising edge of pulse 406 is detected. Referring back to FIG. 2, Sync CCC Detected pulse 406 may be generated by the decode logic 212 of the slave device 204 upon detection of a time synchronization command 210. A selected transition of the sync pulse 402, which is falling edge 408 as shown in FIG. 4, may represent the Time Sync Marker. Referring back to FIG. 3, the Time Sync Marker 314 may align with a selected transition of SCL clock signal during the 'T' bit of Time Stamp Sync command 300 following the detection of Time Sync CCC. Thus, as illustrated in FIG. 4, the Time Sync Marker may align with a selected transition 410 of SCL clock signal 412 following the rising edge of the pulse 406 indicating detection of Sync CCC.

In some embodiments, the sync pulse 402 present at the reset line 404 may reset a counter 414 to all zeroes, as illustrated by waveforms 416 at the output of the counter 414. The counter 414, after being reset to all zeroes, increments on every selected transition (e.g., on every falling edge) of SCL clock signal 412. It can be noted that the approach presented herein and illustrated in FIG. 4, which is based on the sync pulse 402 and the Time Sync Marker aligned with a selected transition of SCL clock signal (which can be controlled by a master device) provides a uniform time reference across all slave devices comprising the circuitry 400 shown in FIG. 4.

Figure 5:
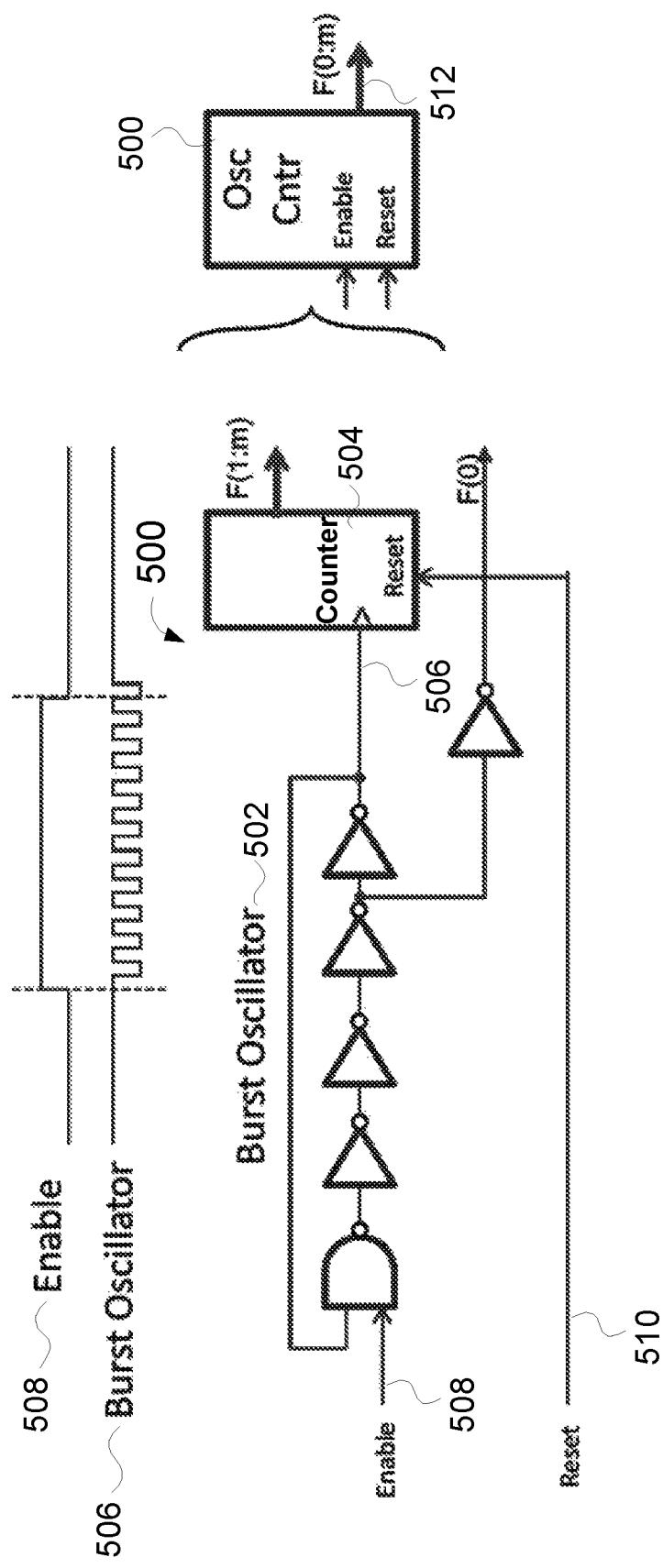
FIG. 5 is an example schematic of an oscillator circuit that may be implemented at a slave device for improving resolution of time synchronization, in accordance with embodiments of the present disclosure.

In some embodiments, a burst oscillator may be employed at a slave device to improve resolution of time-stamping and delayed triggering. FIG. 5 is an example schematic of an oscillator circuit 500 that may be implemented at a slave device 204 for improving resolution of time synchronization, in accordance with embodiments of the present disclosure. In one or more embodiments, the oscillator circuit 500 may be a part of the Time Tracking/Trigger Control circuit 214 of the slave device 204 shown in FIG. 2.

As illustrated in FIG. 5, the oscillator circuit 500 may comprise a burst oscillator 502 and a counter 504. The burst oscillator 502 includes several serially connected inverters that generate a high speed clock signal 506 when enable signal 508 is at a high logic level. A frequency of the high speed clock signal 506 is higher than a frequency of the SCL clock signal. Upon initiation by a reset signal 510, the counter 504 starts counting selected transitions of the high speed clock signal 506. Output F(0) of the burst oscillator 502 and m bit outputs F(1:m) of the counter 504 form an output 512 of the oscillator circuit 500. In one or more embodiments, the burst oscillator 502 may be configured to operate for a limited amount of time sufficient to make a certain number of measurements (e.g., one or two measurements) following detection of an event. Thus, the burst oscillator 502 consumes a limited amount of power.

In one embodiment, certain type of sensors (e.g., accelerometers, gyros) coupled to slave devices inherently have a relatively stable time base, and may use this time base to provide a clock signal that may be utilized to improve resolution of time-stamping and delayed triggering. Other sensors may not have stable time base and need to employ a local oscillator for generating a local clock signal. In an embodiment, the local oscillator at a slave device may be based on Phase Locked Loop (PLL) device that uses SCL clock signal as a reference clock to generate a synchronized and stable local clock of a higher frequency than SCL clock signal. However, this approach has the drawback of consuming continuous power and large silicon area.

Figure 6:
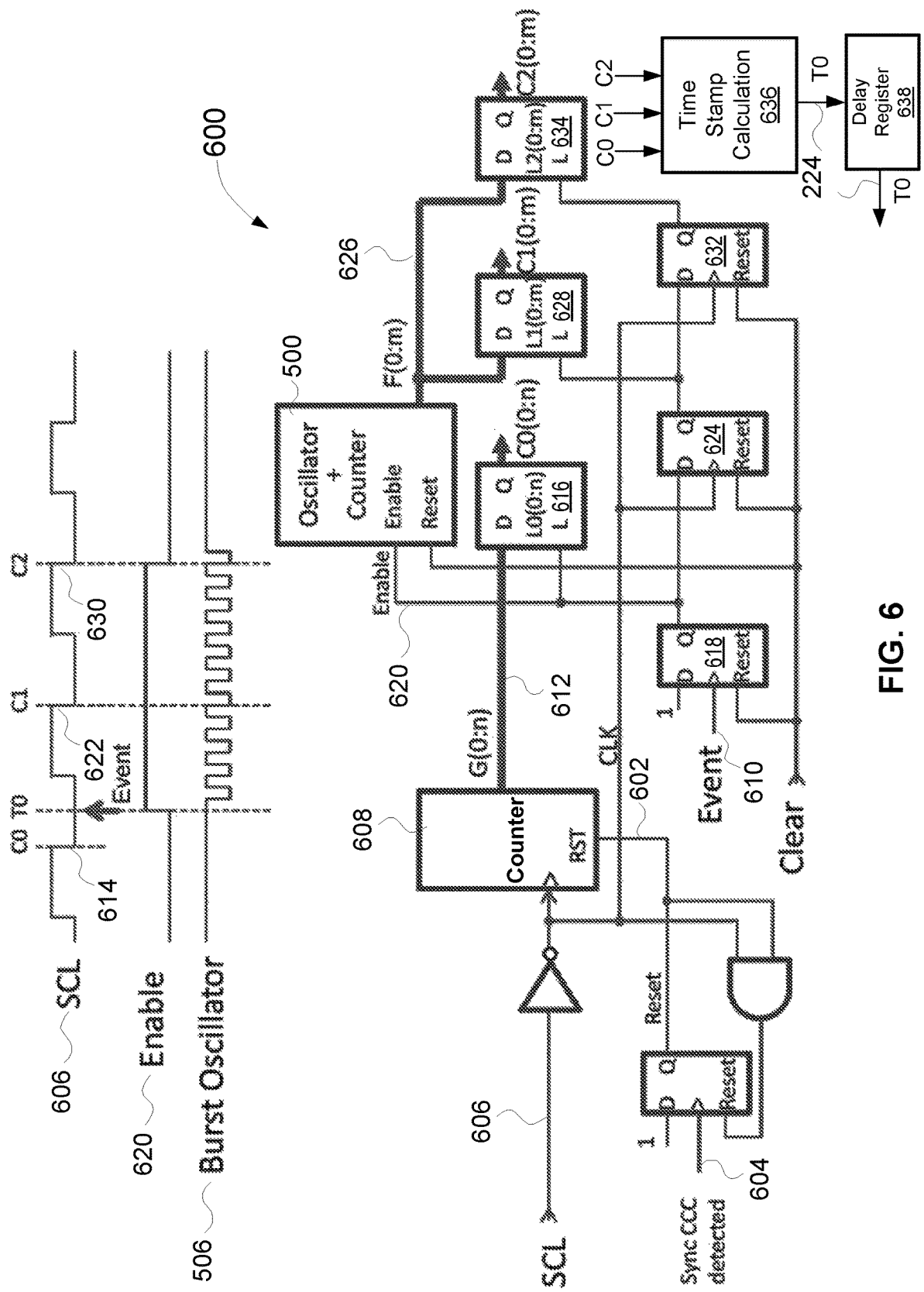
FIG. 6 is an example schematic of circuitry for implementation of time-stamping that may be implemented at a slave device, in accordance with embodiments of the present disclosure.

FIG. 6 is an example schematic of circuitry 600 for implementation of time-stamping at a slave device 204 in accordance with embodiments of the present disclosure. The circuitry 600 may be a part of the Time Tracking/Trigger Control circuit 214 of the slave device 204 shown in FIG. 2. As illustrated in FIG. 6, the circuitry 600 may comprise the circuitry 400 from FIG. 4 and the oscillator circuit 500 from FIG. 5. In some embodiments, the circuitry 600 may be configured to implement a time stamp at a slave device 204, and the oscillator circuit 500 is utilized to increase resolution of the time stamp when compared to using only counts of selected transitions of SCL clock signal for the time stamp.

As discussed above with reference to the circuitry 400 illustrated in FIG. 4, a sync pulse (e.g., the sync pulse 402 shown in FIG. 4) present at a reset line 602 may be generated when (Time) Sync CCC is detected, i.e., when a rising edge of pulse 406 shown in FIG. 4 is detected at an input 604. A falling edge of the sync pulse (e.g., the sync pulse 402 shown in FIG. 4) may represent the Time Sync Marker that aligns with a selected transition (e.g., falling edge 410 shown in FIG. 4) of SCL clock signal 606 during 'T' bit of Time Stamp Sync command (e.g., SDR Time Sync command 210 broadcast from the master device 202 shown in FIG. 2, Time Stamp Sync command 300 shown in FIG. 3) following the detection of Sync CCC at the input 604. The sync pulse present at the reset line 602 may reset a counter 608 to all zeroes. In an embodiment, the counter 608 may be the same counter 414 of the circuitry 400 shown in FIG. 4. The counter 608 may be configured to increment on every selected transition (e.g., falling edge) of SCL clock signal 606, and may provide a uniform time reference across all slave devices (e.g., slave devices 104 illustrated in FIG. 1, multiple slave devices 204 shown in FIG. 2), wherein SCL clock signal 606 may be generated and controlled by a master device (e.g., the master device 102 shown in FIG. 1, the master device 202 shown in FIG. 2).

In some embodiments, an event 610 may be time stamped based at least in part on a value 612 of the counter 608. Upon detecting occurrence of the event 610, the value 612 representing a number of selected transitions of SCL clock signal 606 between the Time Sync Marker and a last selected transition 614 of SCL clock signal 606 prior to detection of the event 610 may be stored in a latch 616 (e.g., the value C0 shown in FIG. 6 may be stored in the latch 616).

In some embodiments, as discussed, the oscillator circuit 500 may be used in conjunction with the counter 608 to provide finer resolution for time-stamping. The oscillator circuit 500 comprising a burst oscillator 502 from FIG. 5 may be configured to generate a periodic oscillator signal having a frequency higher than a frequency of SCL clock signal 606. As illustrated in FIG. 6, upon detection of the event 610, flip flop 618 generates an enable signal 620 that activates the burst oscillator 502 within the oscillator circuit 500. Upon the activation based on the enable signal 620, the burst oscillator 502 of the oscillator circuit 500 may generate a high speed clock signal (oscillator signal) 506, and the counter 504 of the oscillator circuit 500 may keep track of a number of selected transitions (e.g., falling edges) of the oscillator signal 506.

In one or more embodiments, a first selected transition 622 of SCL clock signal 606 immediately following detection of the event 610 causes the output of flip flop 624 to go high, thereby initiating storage of a value 626 at the output of the oscillator & counter circuit 500 in a latch 628. This value is shown as C1. The value of C1 represents a delay, in the form of a number of selected transitions of the oscillator signal 506, between detection of the event 610 and the first selected transition 622 of SCL clock signal 606 following the detection of the event 610.

A next selected transition 630 of SCL clock signal 606 following the first selected transition 622 causes the output of flip flop 632 to go high. As a result, this initiates storage of a new value 626 at the output of the oscillator & counter circuit 500 in a latch 634. This value is shown as C2. The value of C2 represents a delay, in the form of a number of selected transitions of the oscillator signal 506, between detection of the event 610 and the second selected transition 630 of SCL clock signal 606 following the first selected transition 622.

In some embodiments, information about an elapsed time between the Time Sync Marker and detection of the event 610 (i.e., time stamp of the event 610) may be based on the stored values C0, C1 and C2. In one or more embodiments, the time stamp 224 from FIG. 2 may be calculated at a slave device 204 by a time stamp calculation circuit 636 shown in FIG. 6 as:

$$T0 = C0 + \frac{(C2 - 2 \cdot C1)}{(C2 - C1)} \qquad (1)$$

In equation (1), T0 represents the time stamp 224. The information about the time stamp of the event 610 may be communicated via the interface 228 of the slave device 204 to a master device 202 when SDA bus 206 is available. In an embodiment, as illustrated in FIG. 6, the time stamp value T0 defined by equation (1) may be also stored in a delay register 638 before being communicated to the master device 202. The delay register 638 may keep the time stamp value T0 until SDA bus 206 becomes available.

Figure 7:
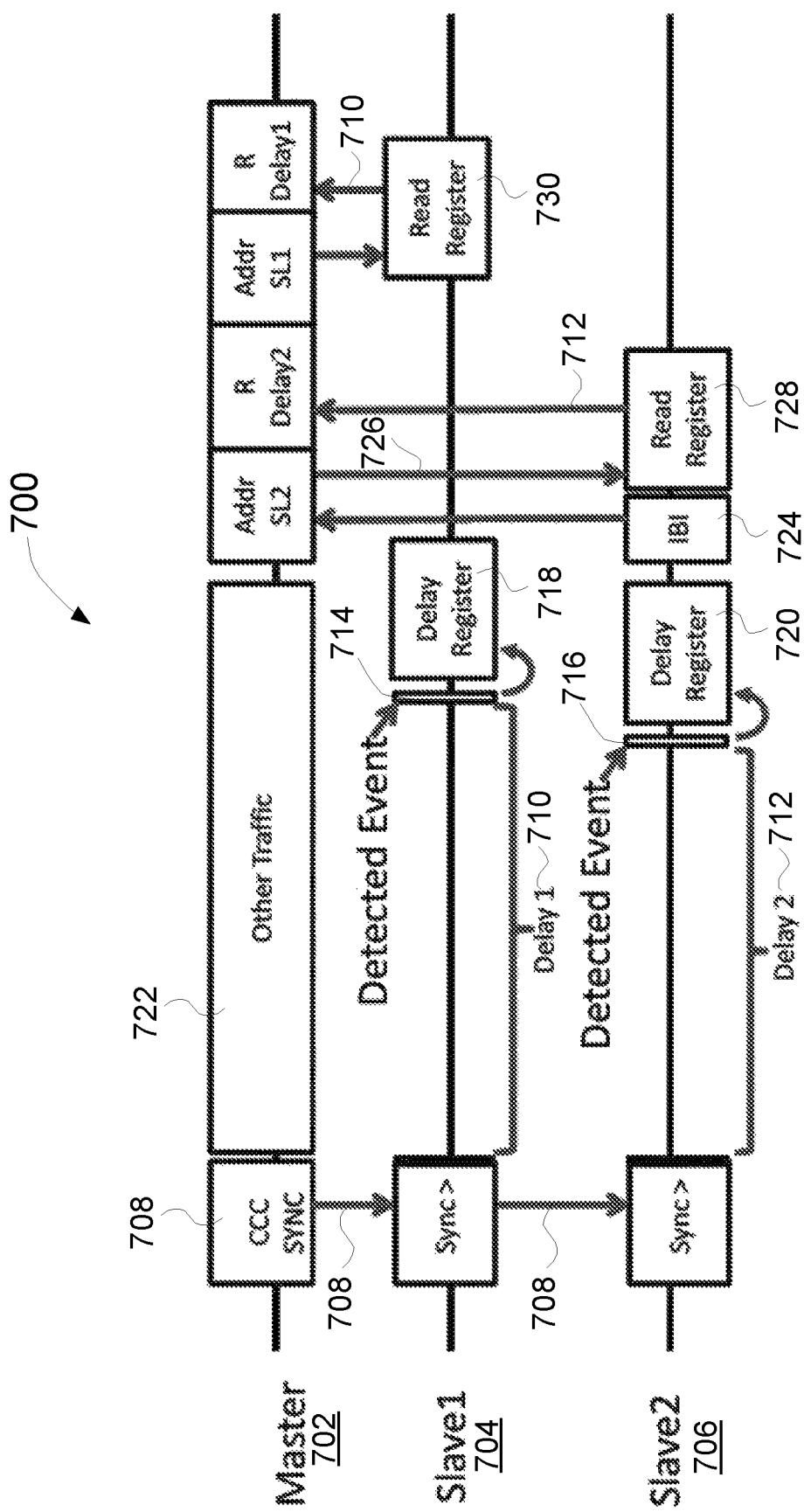
FIG. 7 is an example diagram of capturing and reading time of events by a master device from multiple slave devices, in accordance with embodiments of the present disclosure.

FIG. 7 is an example diagram 700 of capturing and reading time of events by a master device 702 from multiple slave devices 704 and 706, in accordance with embodiments of the present disclosure. The master device 702 may correspond to the master device 202 shown in FIG. 2, and each of the slave devices 704 and 706 may correspond to the slave device 204 shown in FIG. 2. As illustrated in FIG. 7, the master device 702 may broadcast a Time Sync CCC 708 to the slave devices 704, 706. The slave devices 704, 706 may track time delays 710, 712 between a Time Sync Marker (not shown in FIG. 7) generated when Sync CCC 708 is detected at the slave devices 704, 706 and detection of an event at each slave device. When an event 714 is detected at the slave device 704 and an event 716 is detected at the slave device 706, a time delay represented as a number of selected transitions of SCL clock signal (not shown in FIG. 7) tracked at each slave device is latched, i.e., the event is time-stamped in each slave device and stored in a delay register. As illustrated in FIG. 7, the slave device 704 may store the tracked delay 710 as the time stamp of the event 714 into the delay register 718; the slave device 706 may store the tracked delay 712 as the time stamp of the event 716 into the delay register 720. In one or more embodiments, the delay register 718 of the slave device 704 and the delay register 720 of the slave device 706 may correspond to the delay register 638 illustrated in FIG. 6.

In some embodiments, a slave device 204 shown in FIG. 2 may need to wait for a bus free condition on SDA bus 206 before a slave device can initiate an interrupt to a master device 202 shown in FIG. 2. As illustrated in FIG. 7, slave devices 704, 706 may need to wait until traffic 722 on SDA bus is finished. Then, the slave device 706 may initiate an in-band interrupt (IBI) 724 signaling to the master device 702 that the time stamp 712 of the event 716 is available to be read by the master device 702. Upon reception of the IBI 724, the master device 702 may send a request 726 via SDA bus to the slave device 706 requesting to read information about the time stamp 712 of the event 716 that is stored in the delay register 720 of the slave device 706. Upon reception of the request 726, the slave device 706 may read 728 the time stamp 712 from the delay register 720 and provide, via SDA bus, information about the time stamp 712 of the event 716 to the master device 702. After that, the master device 702 may initiate another read 730 from the delay register 720 of the slave device 704 that stores information about the time stamp 710 of the event 714. The information about the time stamp 710 of the event 714 may be then provided, via SDA bus, to the master device 702.

In the illustrative embodiment shown in FIG. 7, the slave device 706 may have a higher priority than the slave device 704. Although the slave device 704 may also initiate IBI, in this case there is no opportunity for the slave device 704 to do so because the master device 702 decides to read the time stamp 710 of the event 714 automatically in response to the IBI 724 received from the slave device 706. It should be also noted that because of the traffic 722 following Sync CCC 708, SCL clock signal (not shown in FIG. 7) may toggle continuously before and after the detected events 714, 716, thus providing a continuous time base for the slave devices 704, 706 to reference.

Figure 8:
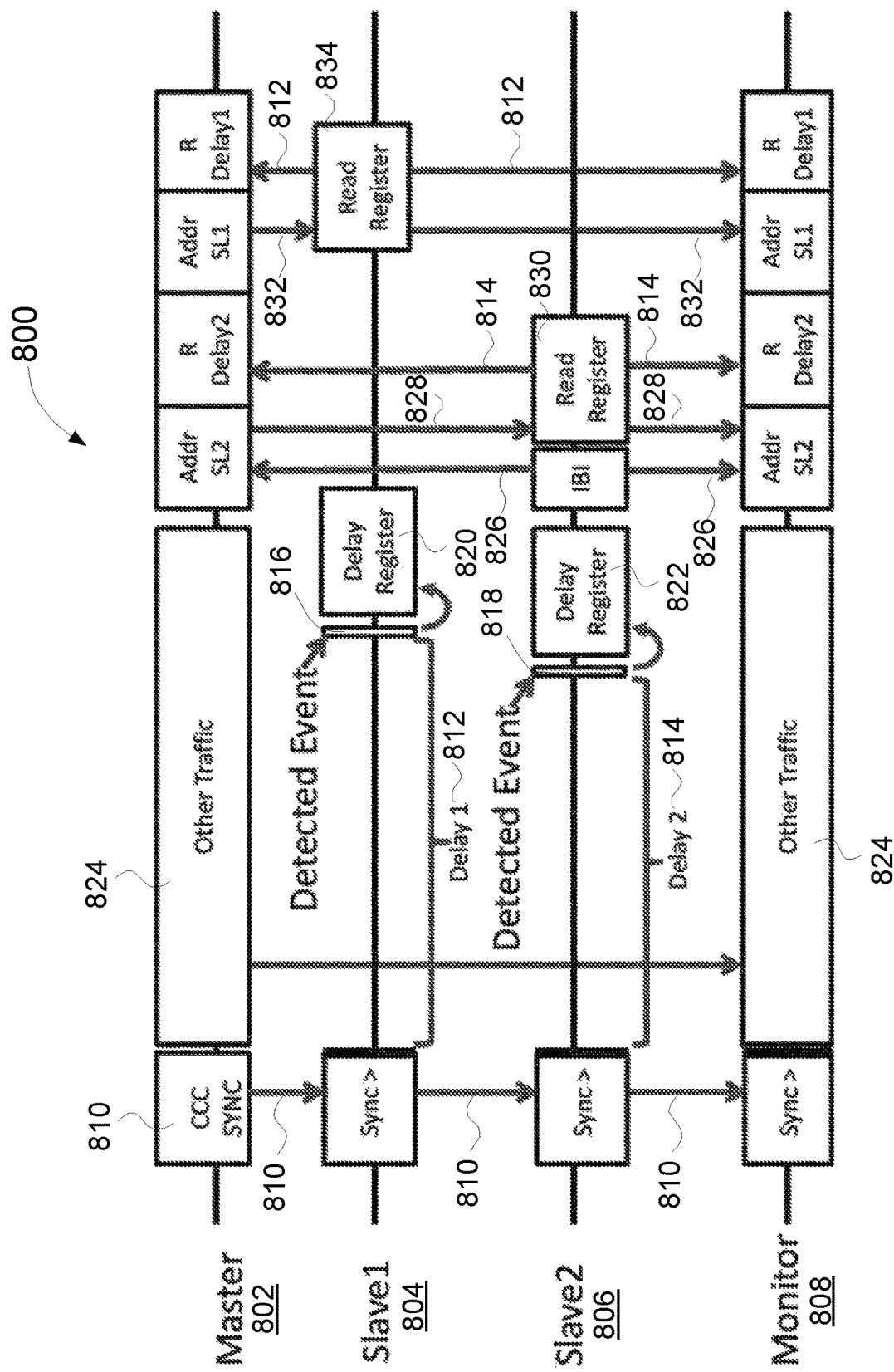
FIG. 8 is an example diagram of capturing and reading time of events by a master device and/or a monitor device from multiple slave devices, in accordance with embodiments of the present disclosure.

FIG. 8 is an example diagram 800 of capturing and reading time of events by a master device 802 and a monitor device 808 from multiple slave devices 804 and 806, in accordance with embodiments of the present disclosure. In some embodiments, the monitor device 808 may be interfaced via SDA bus and SCL bus with the slave devices 804 and 806. Unlike the master device 802, the monitor device 808 does not issue any commands nor generates/controls any clock signals. Instead, the monitor device 808 may simply monitor traffic on SDA bus and collect corresponding information communicated on the SDA bus by the master device 802 and/or the slave devices 804, 806. The master device 802 may correspond to the master device 202 from FIG. 2, and each slave device 804, 806 may correspond to the slave device 204 from FIG. 2.

As illustrated in FIG. 8, the master device 802 may broadcast Time Sync CCC 810 to the slave devices 804, 806 that track time delays 812 and 814 between a Time Sync Marker (not shown in FIG. 8) generated when Sync CCC 810 is detected at the slave devices 804, 806 and detection of an event at each slave device. Sync CCC 810 may be also detected by the monitor device 808. When an event 816 is detected at the slave device 804 and an event 818 is detected at the slave device 806, a time delay tracked at each slave device is latched, i.e., the event is time-stamped in each slave device and stored in a delay register. As illustrated in FIG. 8, the slave device 804 may store the tracked delay 812 between the Time Sync Marker and detection of the event 816 into a delay register 820; the slave device 806 may store the tracked delay 814 between the Time Sync Marker and the event 818 into the delay register 822. In one or more embodiments, the delay register 820 of the slave device 804 and the delay register 822 of the slave device 806 may correspond to the delay register 638 illustrated in FIG. 6.

As further illustrated in FIG. 8, other traffic 824 may be provided on SDA bus by the master device 802. The same traffic 824 may be also monitored by the monitor device 808. In some embodiments, each slave device may need to wait for a bus free condition on SDA bus before the slave device can initiate an interrupt to the master device. As illustrated in FIG. 8, the slave devices 804, 806 may need to wait until traffic 824 on SDA bus is finished. Then, the slave device 806 may initiate IBI signaling 826 via SDA bus that the time stamp 814 of the event 818 is available to be read. The same interrupt 826 sent via SDA bus may be received by both the master device 802 and the monitor device 808. Upon reception of the interrupt 826, the master device 802 may provide, to the slave device 806, a request 828 with an address of the slave device 806 requesting to read information about the time stamp 814 of the event 818 stored in the delay register 822 of the slave device 806. The request 828 comprising the address of the slave device 806 may be also received by the monitor device 808.

Upon reception of the request 828, the slave device 806 may read 830 the time stamp 814 from the delay register 822 and provide, via SDA bus, information about the time stamp 814 of the event 818 to the master device 802. At the same time, since the information about the time stamp 814 of the event 818 is available at SDA bus, the monitor device 808 may also obtain the time stamp 814 of the event 818. After that, the master device 802 may initiate, by sending a request 832 with an address of the slave device 804, another read 834 from the delay register 820 that stores information about the time stamp 812 of the event 816. The address 832 of the slave device 804 may be also received by the monitor device 808 that monitors all traffic on SDA bus. The information about the time stamp 812 of the event 816 may be then provided, via SDA bus, to the master device 802 and the monitor device 808. Upon reception of the time stamp data 812 and 814 from the slave devices 804 and 806, respectively, the master device 802 calculates time of the events 816 and 818 referenced to a global system reference clock signal, i.e., SCL clock signal (not shown in FIG. 8) generated and controlled by the master device 802, as discussed in more detail herein in relation to FIG. 2 and FIG. 12.

In some embodiments, the master device 802 is not capable of processing the time stamp data 812, 814, i.e., the master device 802 does not support converting the time stamp data 812, 814 into actual times of the events referenced to a global system reference clock signal. In this case, the monitor device 808 can be configured to handle processing of the time stamp data 812, 814 received from the slave devices 804, 806, thus allowing usage of a master device that does not support time-stamping. In this configuration, the master device 802 may still control SDA bus and SCL bus, as well as handle reads/writes/interrupts from/to the slave devices 804, 806, as discussed above. However, the master device 802 does not handle the intricacies of time-stamping. Instead, the monitor device 808 is configured to convert the received time stamp data 812, 814 into times of the events 816, 818 referenced to a global system reference clock signal. The monitor device 808 is configured to keep track of selected transitions of SCL clock signal and time the transitions of SCL clock signal to its own accurate time base, in the same way that the master device 802 would have done so, as discussed in more detail in relation to FIG. 2 and FIG. 12.

When the slave device 806 initiates IBI 826 by pulling down SDA bus during a bus-idle state after the traffic 824 is finished, the master device 802 responds by toggling SCL clock signal and initiates read-back of the time stamp information 814 from the slave device by sending the request 828. However, the master device 802 may ignore the received time stamp information 814. Instead, the master device 802 may rely on the monitor device 808 to also read the same time stamp data 814 and use the time stamp 814 to calculate an actual time of the event 818 detected at the slave device 806. Similarly, the monitor device 808 utilizes the time stamp 812 received from the slave device 804 and calculates a time of the event 816 detected at the slave device 804. At a later time, the monitor device 808 may send information about times of the events 816, 818 to the master device 802.

In the illustrative embodiment shown in FIG. 8, the slave device 806 may have a higher priority than the slave device 804. Although the slave device 804 may also initiate IBI, in this case there is no opportunity for the slave device 804 to do so because the master device 802 decides to read the time stamp 812 of the event 816 automatically in response to IBI 826 received from the slave device 806. It should be noted that because of the traffic 824 following Sync CCC 810, SCL clock signal (not shown in FIG. 8) may toggle continuously before and after the detected events 816, 818, thus providing a continuous time base for the slave devices 804, 806 to reference.

Figure 9:
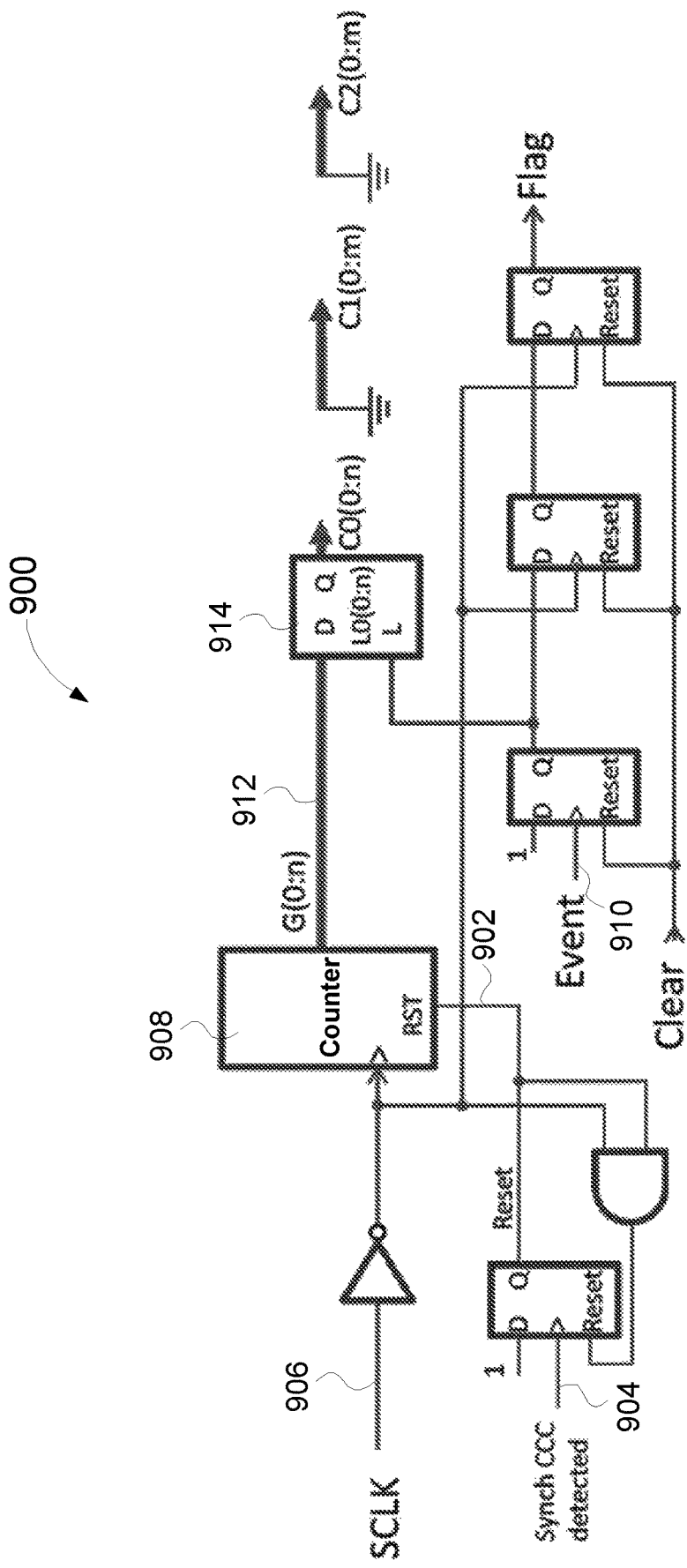
FIG. 9 is an example schematic of circuitry for implementation of time-stamping at a slave device without an oscillator circuit (e.g., the oscillator circuit from FIG. 5), in accordance with embodiments of the present disclosure.

FIG. 9 is an example schematic of circuitry 900 for implementation of time-stamping at a slave device, such as the slave device 204 shown in FIG. 2 without the oscillator circuit 500 from FIG. 5 shown as a part of the time-stamping circuitry 600 in FIG. 6, in accordance with embodiments of the present disclosure. The circuitry 900 may be a part of the Time Tracking/Trigger Control circuit 214 of the slave device 204 shown in FIG. 2.

As discussed above with reference to the circuitry 400 illustrated in FIG. 4, a sync pulse 402 present at a reset line 902 may be generated when (Time) Sync CCC is detected, i.e., when a rising edge of pulse 406 shown in FIG. 4 is detected at an input 904. A falling edge of the sync pulse 402 may represent the Time Sync Marker that aligns with a selected transition 410 of SCL clock signal 906 during 'T' bit of a Time Stamp Sync command (e.g., SDR Time Sync command 210 broadcast from the master device 202 shown in FIG. 2, Time Stamp Sync command 300 shown in FIG. 3) following detection of Sync CCC at the input 904. The sync pulse present at the reset line 902 may reset a counter 908 to all zeroes. The counter 908 may correspond to the counter 414 of the circuitry 400 shown in FIG. 4. The counter 908 may be configured to increment on every selected transition of SCL clock signal 906, and may provide a uniform time reference across all slave devices while SCL clock signal 906 may be generated and controlled by a master device.

In some embodiments, an event 910 may be time stamped based at least in part on a value 912 of the counter 908. Upon detection of the event 910, the value 912 representing a number of selected transitions of SCL clock signal 906 between the Time Sync Marker and a last selected transition of SCL clock signal 906 prior to detection of the event 910 may be stored in a latch 914. As illustrated in FIG. 9, the value C0 representing the number of selected transitions of SCL clock signal 906 between the Time Sync Marker and detection of the event 910 is stored in the latch 914.

Since the oscillator circuit 500 comprising the burst oscillator 502 from FIG. 5 is not included in the circuitry 900 illustrated in FIG. 9, values of C1 and C2 associated with finer resolution of time-stamping are place-holders and set to zero. After reading time-stamp data 224 given by the value of C0 stored in the latch 914 associated with the time of the event 910, a master device 202 illustrated in FIG. 2 may translate, by the real time calculation unit 256, a value of C0+1 and a value of C0+2 into a system reference time for each value, i.e., into real times T1 and T2, respectively. In some embodiments, the value of C0+1 represents a number of selected transitions of SCL clock signal 906 between the Time Sync Marker and a first selected transition of SCL clock signal 906 following the event 910, and the value of C0+2 represents a number of selected transitions of SCL clock signal 906 between the Time Sync Marker and a second selected transition of SCL clock signal 906 following the event 910. The master device 202 may then determine, along with T1 and T2, a system reference (real) time T of the event 910. Hence, $$T = T1 - \frac{(T2-T1) \cdot C1}{(C2-C1)} \text{ where } C2 > C1 \text{ else } T = T1. \quad (2)$$

In the illustrative embodiment shown in FIG. 9, both values of C1 and C2 are set to zeroes, and the real time T of the event 910 may be determined only based on the value of C0+1, i.e., the real time T of the event 910 may be equal to T1.

In accordance with embodiments of the present disclosure, as discussed above, multiple slave devices can initiate simultaneous operations (e.g., measurements) based on Time Sync triggering controlled by a master device via SDA bus. Based on this approach, additional communication channels between the master device and the slave devices can be eliminated. Embodiments of the present disclosure support usage of a time synchronization command broadcast by the master device that can start a timer at each slave device that triggers an event (e.g., measurement) at the end of a pre-determined time period. In one or more embodiments, a time delay for a triggering event at each slave device can be set by a command communicated by the master device via SDA bus that may precede the time synchronization command.

Figure 10:
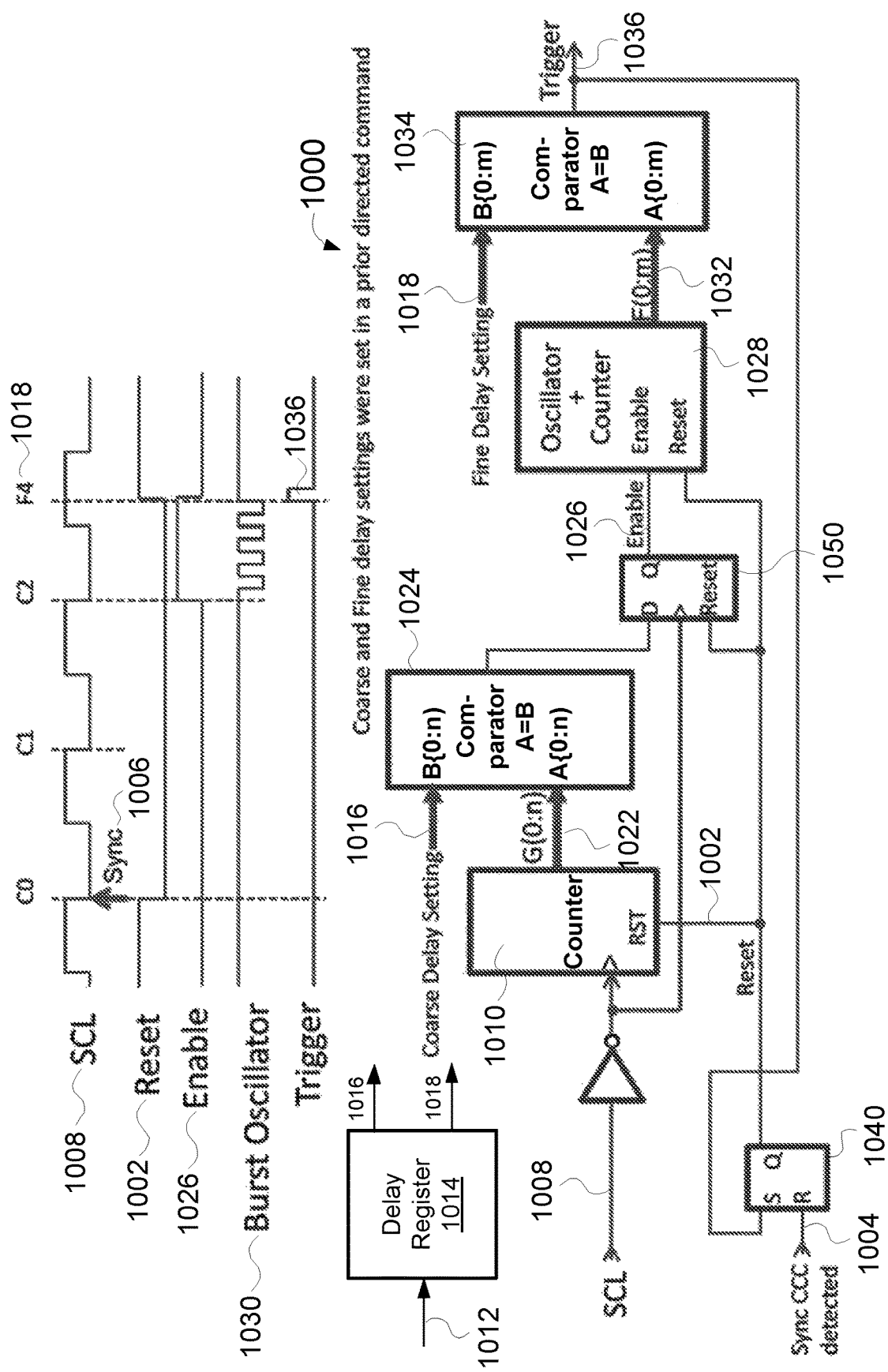
FIG. 10 is an example schematic of circuitry for implementation of delayed triggering at a slave device, in accordance with embodiments of the present disclosure.

FIG. 10 is an example schematic of circuitry 1000 for implementation of delayed triggering at a slave device 204 illustrated in FIG. 2, in accordance with embodiments of the present disclosure. The circuitry 1000 may be a part of the Time Tracking/Trigger Control circuit 214 of the slave device 204 shown in FIG. 2. In some embodiments, a master device 202 illustrated in FIG. 2 may control an exact time of a trigger generated at each slave device 204.

A flip flop 1040 generates a sync pulse on a reset line 1002 when (Time) Sync CCC is detected at an input 1004, i.e., when the time synchronization command is detected. A falling edge of the sync pulse may represent a Time Sync Marker 1006 that aligns with a selected transition of SCL clock signal 1008 during 'T' bit of the time synchronization command (e.g., SDR Time Sync command 210 broadcast from the master device 202 shown in FIG. 2) following detection of the time synchronization command at the input 1004. The sync pulse present at the reset line 1002 may reset a counter 1010 to all zeroes. In an embodiment, the counter 1010 may correspond to the counter 414 of the circuitry 400 shown in FIG. 4. The counter 1010 increments on every selected transition of SCL clock signal 1010, and may provide a uniform time reference across all slave devices 204, wherein SCL clock signal 1008 may be generated and controlled by the master device 202.

The circuit 1000 illustrated in FIG. 10 may be generally configured to track a number of selected transitions of SCL clock signal 1008 after the time synchronization command is detected and to generate a trigger signal responsive to the number of selected transitions of SCL clock signal 1008 reaching a delay setting indicated by delay setting information 1012, which can be provided by the master device 202 into a delay register 1014. In some embodiments, the delay setting information 1012 may comprise coarse delay setting information 1016 and fine delay setting information 1018 that may be set in a command communicated by a the master device 202 via SDA bus prior to broadcasting Time Sync command. The coarse delay setting information 1016 indicates a trigger delay in the form of a number of selected transitions of SCL clock signal 1008 that are to occur between the Time Sync Marker 1006 and generation of the trigger signal. As illustrated in FIG. 10, a comparator 1020 may be configured to compare the coarse delay setting information 1016 and a value 1022 of the counter 1010 representing a number of selected transitions of SCL clock signal 1008 occurred after the Time Sync Marker 1006. When the value 1022 of the counter 1010 is equal to the coarse delay setting information 1016 and a tracked number of selected transitions of SCL clock signal 1008 reaches the coarse delay setting information 1016, the output of the comparator 1024 becomes a logical '1'. As a result, flip flop 1050 causes enable signal 1026 to become logical '1' and enable operation of an oscillator and counter circuit 1028. The oscillator and counter circuit 1028 can be used in conjunction with the counter 1010 and the comparator 1024 to provide finer resolution for delayed triggering.

For some embodiments, the oscillator and counter circuit 1028 may correspond to the oscillator circuit 500 illustrated in FIG. 5, which comprises the burst oscillator 502 and the counter 504. When enabled by the enable signal 1026, the oscillator and counter circuit 1028 internally generates a burst oscillator signal 1030 with a frequency higher than a frequency of SCL clock signal 1008. As illustrated in FIG. 10, upon activation of the oscillator and counter circuit 1028 by the enable signal 1026, the burst oscillator within the oscillator and counter circuit 1028 may generate the burst oscillator signal 1030, whereas the counter within the oscillator and counter circuit 1028 may keep track of a number of selected transitions of the burst oscillator signal 1030. The fine delay setting information 1018 indicates a trigger delay in the form of a number of selected transitions of the burst oscillator signal 1030 that are to occur between the enable signal 1026 and generation of the trigger signal. Once the number of selected transitions of the burst oscillator signal 1030 represented by a signal 1032 at the output of the oscillator and counter circuit 1028 reaches the fine delay setting 1018, a comparator 1034 causes the logic level of the trigger signal 1036 to become a logical "1". The trigger signal 1036 switches logic states at an exact time instant controlled by the master device 202 based on coarse and fine delay setting information. The trigger signal 1036 generated by the circuitry 1000 illustrated in FIG. 10 may correspond to the delayed trigger signal 238 generated by the Time Tracking/Trigger Control circuit 214 of the slave device 204 shown in FIG. 2. The delayed trigger signal 238 may initiate operation of the transducer 240 coupled to the slave device 204 at an exact time instant controlled by the master device 202.

Figure 11:
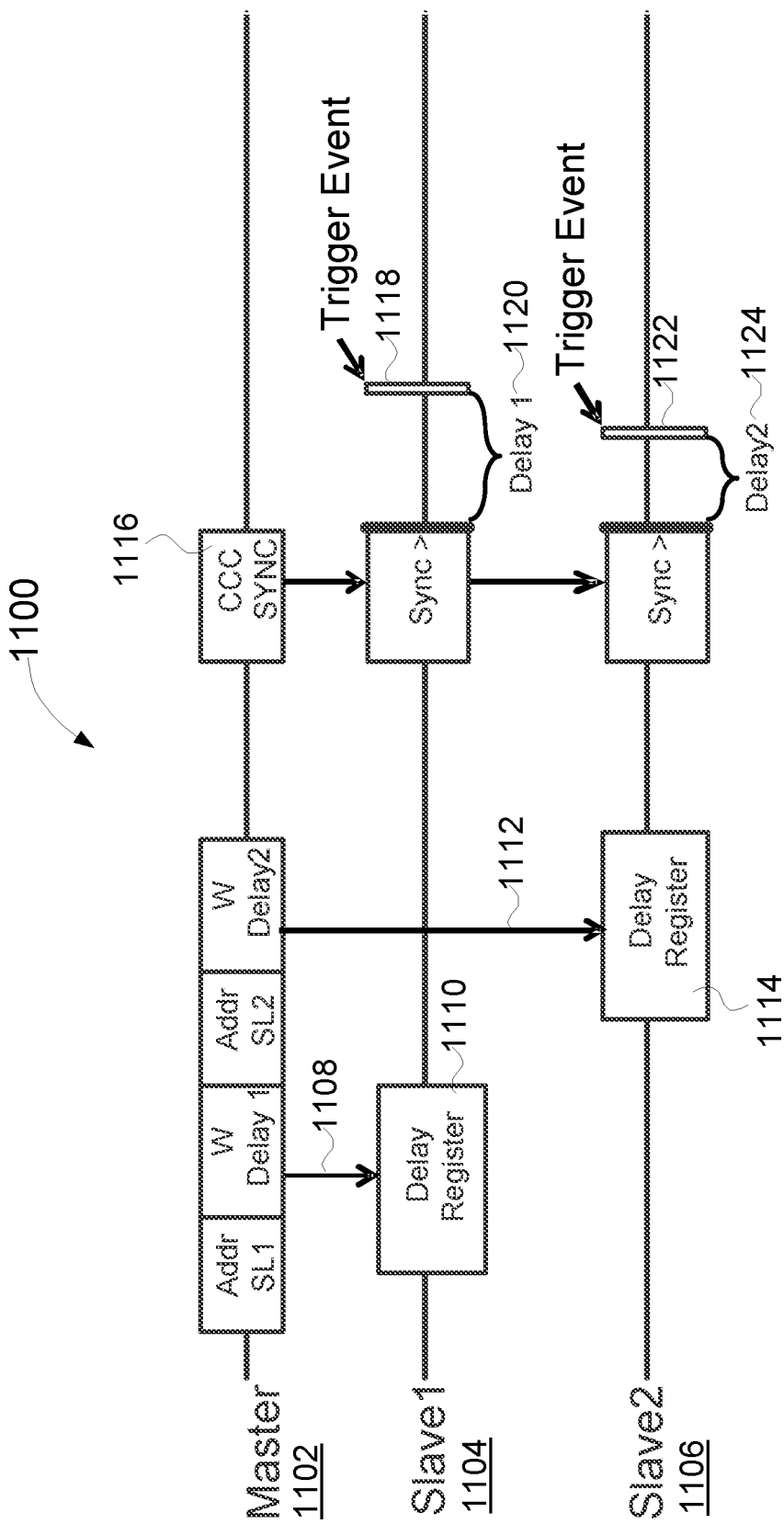
FIG. 11 is an example diagram of controlling time of events by a master device at multiple slave devices, in accordance with embodiments of the present disclosure.

FIG. 11 is an example diagram 1100 of controlling time of events at multiple slave devices by a master device, in accordance with embodiments of the present disclosure. As illustrated in FIG. 11, a master device 1102 may provide to slave devices 1104 and 1106 delay setting information, i.e., delay setting information 1108 may be stored at a delay register 1110 of the slave device 1104, and delay setting information 1112 may be stored at a delay register 1114 of the slave device 1106. The delay register 1110 of the slave device 1104 and the delay register 1114 of the slave device 1106 may correspond to the delay register 1014 shown in FIG. 10. In some embodiments, as discussed, delay setting information 1108 and 1112 may be communicated via SDA bus to the slave devices 1104 and 1106 via SDR commands sent from the master device 1102. The master device 1102 may correspond to the master device 202 from FIG. 2, and each slave device 1104, 1106 may correspond to the slave device 204 from FIG. 2.

As further illustrated in FIG. 11, following communication of delay setting information 1108 and 1112, the master device 1102 may broadcast via SDA bus a time synchronization command, Sync CCC 1116. Upon detection of Sync CCC 1116 at the slave devices 1104 and 1106, a Time Sync Marker (not shown in FIG. 11) may be generated at each slave device, i.e., the slave devices 1104 and 1106 may be synchronized by clearing their respective counters. Starting from the Time Sync Marker, the slave devices 1104 and 1106 may track reference time that may be provided by the master device 1102 via SCL clock signal. When the tracked time at the slave device 1104 reaches the delay setting information 1108, the slave device 1104 may generate a trigger in the form of a trigger event 1118, which may be delayed by a specific reference time 1120 from the Time Sync Marker. Similarly, when the tracked time at the slave device 1106 reaches the delay setting information 1112, the slave device 1106 may generate a trigger in the form of a trigger event 1122, which may be delayed by a specific reference time 1124 from the Time Sync Marker.

Figure 12:
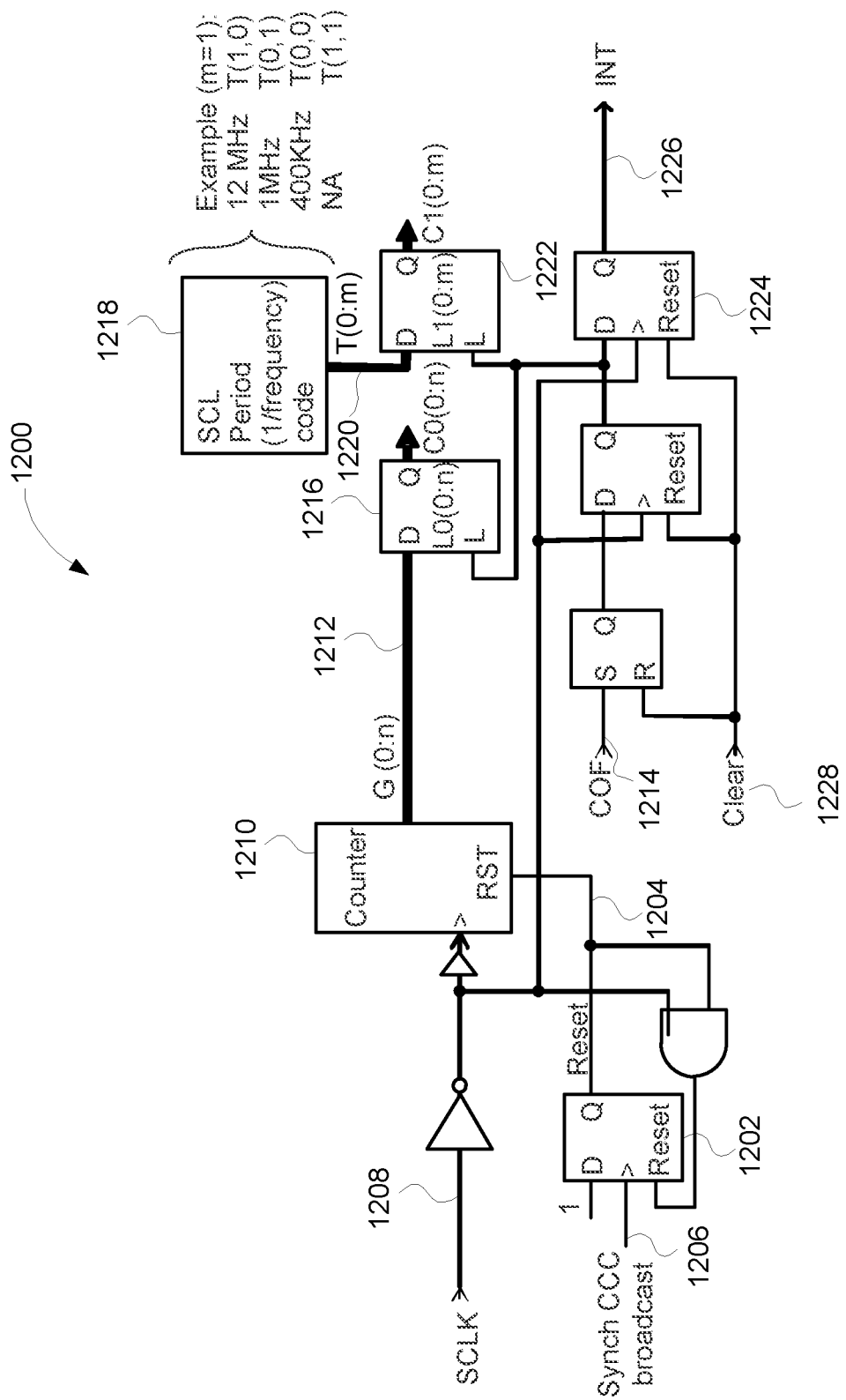
FIG. 12 is an example schematic of circuitry that may be implemented at a master device for supporting time stamping, in accordance with embodiments of the present disclosure.

In some embodiments, as discussed, a master device 202 illustrated in FIG. 2 may track system reference time, starting from Time Sync Marker indicated by a time synchronization command, in order to convert a time stamp of an event detected at a slave device 204 into a system (real)

time that is referenced to a global clock signal being generated and controlled by the master device 202. FIG. 12 is an example schematic of circuitry 1200 implemented at the master device 202 for supporting time stamping, in accordance with embodiments of the present disclosure. The circuitry 1200 illustrated in FIG. 12 may correspond to the time tracking circuit 234 of the master device 202 shown in FIG. 2.

Flip flop 1202 generates a sync pulse on reset line 1204 when a Sync CCC broadcast is indicated by a signal at input 1206 having a high logic level. A falling edge of the sync pulse may represent a Time Sync Marker that aligns with a selected transition of SCL clock signal 1208 during 'T' bit of a time synchronization command detected at the input 1206. The sync pulse present at the reset line 1204 may reset a counter 1210 to all zeroes. The counter 1210 may correspond to the counter circuit 248 of the master device 202 shown in FIG. 2. The counter 1210 increments on every selected transition of SCL clock signal 1208, and may provide a uniform time reference between the master device and all slave devices. In an embodiment, when the master device controls SCL bus (e.g., as in SDR and Dual Data Rate (DDR) modes), SCL clock signal 1208 may be derived from a reference clock by the clock generator 260 from FIG. 2 and controlled by the master device 202.

In some embodiments, frequency changes of SCL clock signal 1208 may be stamped using a value 1212 of the counter 1210. Once a change of frequency (COF) signal 1214 that indicates a change of frequency of SCL clock signal 1208 becomes logical '1', the value 1212 of the counter 1210 may be stored into a latch 1216, indicated as value C0 in FIG. 12. In an embodiment, the value of C0 represents a number of selected transitions of SCL clock signal 1208 between the Time Sync Marker and a last selected transition of SCL clock signal 1208 prior to a first change of frequency of SCL clock signal 1208. Referring back to FIG. 2, the value C0 stored into the latch 1216 in FIG. 12 may correspond to the SCL count C0 stored in the latch 250 of the master device 202 upon COF signal 252 goes high.

In some embodiments, a register or look-up table 1218 may store information related to different periods associated with different frequencies of SCL clock signal 1208. For example, as illustrated in FIG. 12, bits T(1,0) may encode duration of a period when a frequency of SCL clock signal 1208 is 12 MHz; bits T(0,1) may encode duration of a period when a frequency of SCL clock signal 1208 is 1 MHz; and bits T(0,0) may encode duration of a period when a frequency of SCL clock signal 1208 is 400 KHz. A value 1220 encoded by bits T(0:m) at the output of the register 1218 may be used in conjunction with the value of C0 stored in the latch 1216 to provide the relationship between a number of selected transitions of SCL clock signal 1208 and real time reference. Once COF signal 1214 that indicates a change of frequency of SCL clock signal 1208 becomes logical '1', the value 1220 encoded by bits T(0:m) at the output of the register 1218 may be stored into a latch 1222, indicated as value C1. Therefore, the value of C1 may represent a period of SCL clock signal 1208 prior to a change of frequency of SCL clock signal 1208. The latched values of C0 and C1 may provide information about system time reference between the Time Sync Marker and COF.

In some embodiments, as illustrated in FIG. 12, when the value 1212 indicating a number of selected transitions of SCL clock signal 1208 between the Time Sync Marker and a change of frequency of SCL clock signal 1208 and the value 1220 representing encoded period of a frequency of SCL clock signal 1208 prior to the change of frequency are stored as values C0 and C1 respectively, a next selected transition of SCL clock signal 1208 may cause a flip flop 1224 to produce an interrupt (INT) signal 1226 initiating storage of the values C0 and C1 into a cache or register file. After that, Clear signal 1228 may be pulsed, which may reset the latches 1216 and 1222, i.e., the latched values C0 and C1 are cleared after being stored into the cache or register file based on the INT signal 1226. Referring back to FIG. 2, the values of C0 and C1 stored into the cache or register file may correspond to CNT_1 and T1 values stored in the register file 254 of the master device 202 shown in FIG. 2 upon COF signal 252 goes high.

Referring back to FIG. 12, after the latches 1216, 1222 are reset, the circuitry 1200 may continue to track a number of selected transitions of SCL clock signal 1208 following the first change of frequency of SCL clock signal 1208 until a next change of frequency of SCL clock signal 1208, The latched values C0 and C1 in FIG. 12 may provide information about reference time between the Time Sync Marker and that next change of frequency of SCL clock signal 1208 indicated by COF signal 1214. In this way, the master device 202 in FIG. 2 can track reference time based on SCL clock signal 1208 generated and controlled by the master device 202 starting at the Time Sync Marker, and utilize this reference time information to correlate it with a time stamp of an event detected at a slave device 204 for calculation of real time referenced to SCL clock signal 1208 of occurrence of the event detected at the slave device 204.

Starting from the time of synchronization represented by the Time Sync Marker, the master device 202 stores a time of the Time Sync Marker and counts by the counter 1210 each selected transition of SCL clock signal 1208. The master device 202 stores, in the latches 1222 and 1216, a measure 1220 representing a frequency of SCL clock signal 1208 (i.e., value C1) and a count 1212 of selected transitions of SCL clock signal 1208 at which a frequency change of SCL clock signal 1208 occurs indicated by COF signal 1214 (i.e., value C0). Upon INT 1226 initiated by COF signal 1214, the stored values of C0 and C1 may be transferred from the latches 1216, 1222 into the cache or register file. Referring back to FIG. 2, the values of C0 and C1 transferred into the cache or register file may correspond to CNT_i and Ti values, respectively, which are stored in the register file 254 of the master device 202 each time when COF signal 252 goes high, providing reference time information. In some embodiments, as discussed, the master device 202 may receive, via SDA bus 206, the time stamp 224 of the event 222 detected at the slave device 204. The master device 202 may use reference time information stored in the register file 254, i.e., CNT_i and Ti values, to reconstruct a time instant of any selected transition of SCL clock signal without actually storing the time of each such transition. When the master device 202 receives the SCL clock signal count or the time stamp 224 of the event 222 detected at the slave device 204, the master device 202 correlates, at the real time calculation unit 256, the time stamp 224 and the reference time information of the register file 254 to determine the exact time instant 258 of the event 222 with respect to the system reference clock.

Figure 13:
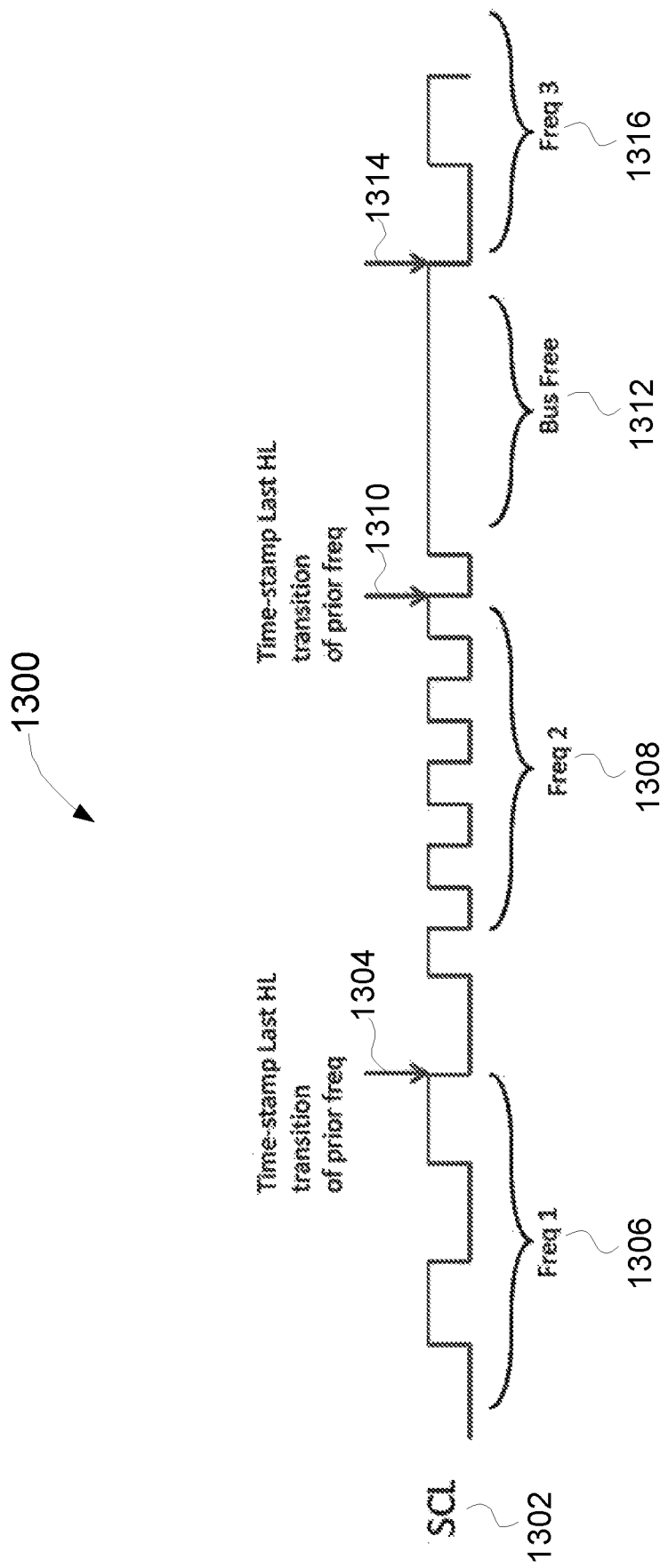
FIG. 13 is a diagram illustrating a method performed at a master device for time stamping changes in a reference clock signal, in accordance with embodiments of the present disclosure.

FIG. 13 is a diagram 1300 illustrating a method performed at a master device 202 illustrated in FIG. 2 for time stamping changes in SCL clock signal, which may be performed by the circuitry 1200 in FIG. 12, in accordance with embodiments of the present disclosure. As illustrated in FIG. 13, SCL clock signal 1302 driving SCL bus may change its frequency, which may be controlled by the master device 202. Furthermore, for some period of time, SCL clock signal 1302 may have no transitions, which corresponds to bus free condition. Thus, SCL clock signal 1302 is not periodic for a certain period of time during bus free condition, whereas SCL clock signal 1302 may become periodic again, as illustrated in FIG. 13. As discussed above in relation to the circuitry 1200 illustrated in FIG. 12, the master device 202 may time stamp a last selected transition of SCL clock signal 1302 prior to a change of frequency of SCL clock signal 1302. As illustrated in FIG. 13, a selected last transition 1304 related to a prior clock frequency 1306 of SCL clock signal 1302 may be time-stamped relative to a Time Sync Marker (not shown). After that, a last selected transition of SCL clock signal 1302 for a next clock frequency 1308 is also time-stamped, i.e., a last high-to-low transition 1310 of SCL clock signal 1302 before bus free condition 1312 is time-stamped. The time stamp 1310 together with the time stamp 1304 indicates time between two consecutive changes of frequency of SCL clock signal 1302. It should be noted that bus free condition 1312 when SCL clock signal 1302 is not periodic can be also considered as a change of frequency of SCL clock signal 1302 as the frequency of SCL clock signal 1302 actually changes from non-zero frequency 1308 to zero. Thus, a high-to-low transition 1314 of SCL clock signal 1302 when transitioning from bus free condition 1312 to a new clock frequency 1316 is also time-stamped. The time stamp 1314 together with the time stamp 1310 indicates duration of the bus free condition 1312.

In some embodiments, as discussed, a master device 202 illustrated in FIG. 2 can use the time-stamped selected transitions of SCL clock signal 1302 (e.g., the time-stamped transitions 1304, 1310, 1314, and so on) to determine a system reference time of any time-stamped event a slave device 204 had detected. The time stamps 1304, 1310, 1314 may correspond to the values CNT_i stored in the register file 254 of the master device 202. The master device 204 may correlate the time-stamp 224 of the event 222 detected at the slave device 204 with the time-stamped transitions 1304, 1310, 1314 of SCL clock signal including information about periods Ti of SCL clock signal, and determine by the real time calculation circuit 256 a system reference time 258 of the event.

Embodiments of the present disclosure relate to a method for translation of a system time base at a master device to a local time base at a slave device for time stamping and delayed triggering. Referring back to FIG. 2, a master device 202 may be configured to generate a reference SCL clock signal 208 that is also available at one or more slave devices 204. In one or more embodiments, the reference SCL clock signal 208 may have a certain resolution and may be translatable into a system time. The master device 202 may then provide an indication of synchronization in the form of Time Sync commands 210 and 300 shown in FIG. 2 and FIG. 3 on SDA bus 206. By providing the indication of synchronization, the master device 202 may also set a reference point on SDA bus 206, which can correspond to a selected transition of reference SCL clock signal 208 during Time Sync command. The reference point provided by the master device 202 may be received at each slave device 204 as Time Sync Marker aligned with a selected transition of reference SCL clock signal 208. In some embodiments, as discussed, in response to receiving the reference point, each slave device 204 may track an amount of time that has passed in a local time reference. In response to detecting an event at that slave device 204, an indication of the amount of local time that has passed when the event was detected can be loaded into a register and/or can be send to SDA bus 206. In addition, based on the reference point provided by the master device 202 and the reference SCL clock signal 208, each slave device 204 may generate a trigger signal at a time instant directly controlled by the master device 202 and referenced based on the system time base.

Embodiments of the present disclosure further relate to a method for translation of a local time base at a slave device to a system time base at a master device for time stamping. One or more slave devices 204 may monitor for occurrence of an event. At each slave device 204, as discussed, the occurrence of the event can be marked in a local time base, and time stamp of the event can be latched at the slave device 204. Before starting monitoring for occurrence of an event, each slave device 204 may receive from the master device 202 via SDA bus 206 a reference point signal in a form of Time Sync Marker. The Time Sync Marker may be based on a reference clock, such as SCL clock signal 208, generated and controlled at the master device 202, and may be therefore translatable into a system-wide time base. At each slave device 204, a latency can be determined between a time when the Time Sync Marker is received at that slave device 204 and a time when the occurrence of the event is detected in the local time base. The latency corresponds to the time of the event in the local time base and can be reported to the master device 202. In some embodiments, as discussed, the master device 202 may determine respective times in the system-wide time base of occurrence of each of the events at slave devices 204.

Figure 14:
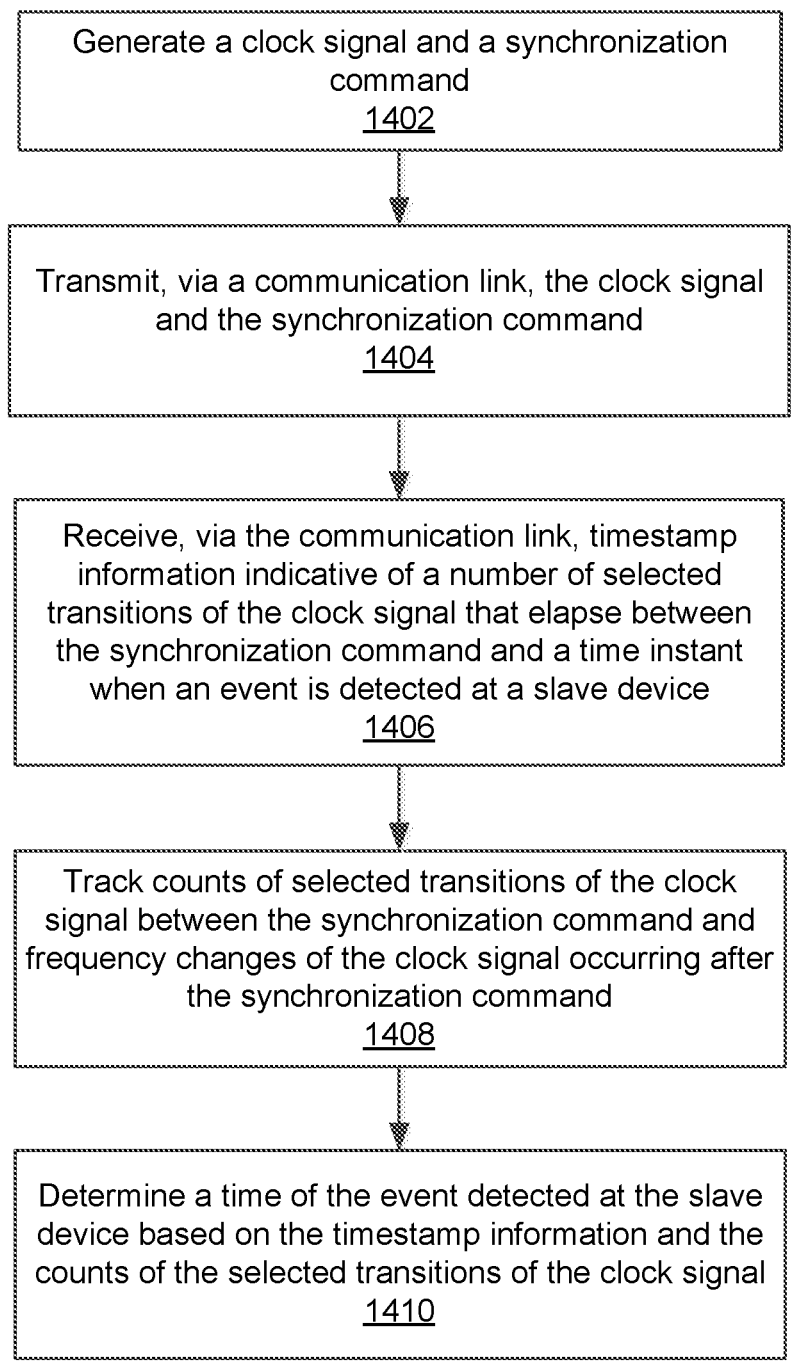
FIG. 14 is a flow chart illustrating a method for time stamping that may be performed at a master device, in accordance with embodiments of the present disclosure.

FIG. 14 is a flow chart illustrating a method 1400 for time stamping that may be performed at a master device 202 illustrated in FIG. 2, in accordance with embodiments of the present disclosure.

Operations of the method 1400 may begin by the master device 202 generating 1402 a clock signal (e.g., SCL clock signal 208) and a synchronization command, such as Time Sync command 210.

The master device 202 transmits 1404 the clock signal and the synchronization command via the communication link, such as the communication link 205 illustrated in FIG. 2 that comprises SCL line 208 and SDA line 206.

The master device 202 receives 1406 timestamp information (e.g., time stamp 224) via the communication link, the timestamp information indicative of a number of selected transitions of the clock signal that elapse between the synchronization command and a time instant when an event is detected at the slave device (e.g., the event 222 detected at the slave device 204).

The Time Tracking circuit 234 of the master device 202, shown in more detail as the circuitry 1200 in FIG. 12, tracks 1408 counts of selected transitions of the clock signal between the synchronization command and frequency changes of the clock signal occurring after the synchronization command.

The real time calculation unit 256 of the master device 202 determines 1410 a time of the event detected at the slave device based on the timestamp information and the counts of the selected transitions of the clock signal.

FIG. 15 is a flow chart illustrating a method 1500 for delayed triggering that may be performed at a slave device 204 illustrated in FIG. 2, in accordance with embodiments of the present disclosure.

Operations of the method 1500 may begin by the slave device 204 receiving 1502, via a communication link that carries a clock signal (e.g., SCL clock signal 208), a synchronization command (e.g., Time Sync command 210) and delay setting information that may be provided by the SDR command 210 generated by the master device 202 prior to the Time Sync command. In some embodiments, as discussed, the communication link may correspond to the communication link 205 that comprises SDA line 206 and SCL line 208.

The Time Tracking/Trigger Control circuit 214 of the slave device 202, shown in more detail as the circuitry 1000 in FIG. 10, tracks 1504 a number of selected transitions of the clock signal (e.g., falling edges of SCL clock signal 208) after the synchronization command.

The slave device 204 generates 1506 a trigger signal, such as the delayed trigger 238, responsive to the number of selected transitions reaching a delay setting indicated by the delay setting information.

FIG. 16 is a flow chart illustrating a method 1600 for delayed triggering that may be performed at a master device 202 illustrated in FIG. 2, in accordance with embodiments of the present disclosure.

Operations of the method 1600 may begin by the master device 202 transmitting 1602, via a communication link, a clock signal (e.g., SCL clock signal 208) and a synchronization command (e.g., Time Sync command 210). In some embodiments, as discussed, the communication link may correspond to the communication link 205 that comprises SDA line 206 and SCL line 208.

The master device 202 transmits 1604 delay setting information indicating a number of selected transitions of the clock signal that are to occur between the synchronization command and generation of a trigger signal (e.g., the delayed trigger 238) at one or more slave devices 204 coupled to the communication link. In some embodiments, as discussed, the delay setting information may comprise coarse and fine delay setting information located in the SDR command 210 generated by the master device 202 prior to the synchronization command.

In some embodiments, a new slave device may be "hot-joined" to communication link 205, where master device 202 has already initiated a synch to other devices previously coupled to communication link 205, and it may be desirable to allow the newly hot-joined slave device to sync with the rest of the devices coupled to communication link 205, but without re-synching the other devices. In such embodiments, upon detecting the new slave device (e.g., when the new slave device acknowledges a broadcast or interjects an IBI, for example), master device 202 may issue a CCC directed Time Synch command directly to the new slave device (as opposed to a CCC broadcast Time Synch) and store the corresponding SCL initialize-count (e.g., cross referenced to the new slave device's bus address) at synch of the new slave device. When master device 202 subsequently reads back a time stamp from the new slave device, master device 202 may be configured to add the stored SCL initialize-count to the read-back time stamp when determining the real/system time of the corresponding time-stamped event detected and reported by the new slave device. Such stored SCL initialize-count may be set to zero by default and when a broadcast Time Synch is generated. Such process can also be used to re-synch a slave device with a malfunctioning or faulty connection to connection link 205 and/or after a forced restart/reboot of the slave device, such as after a failure of its coupled peripheral device or a program execution failure or fault.

In embodiments where multiple slave devices are implemented with their own burst oscillators to improve resolution of time-stamping and delayed triggering, systems implemented according to the methodologies described herein advantageously minimize the phase error that can occur due to separate oscillators oscillating at relatively high but slightly different frequencies. For example, even if the frequency of the SCL signal varies or is unknown (e.g., although timing information of the SCL signal that master device 202 gathers is not needed to decode the order of events detected by different sensors from time-stamp data provided by their respective slave devices, it can be necessary in order to place the timing of the events in a real world context), the uncertainty in determining whether a first event happened before or after a second event is only dependent on the total accumulated phase error of the local burst oscillator (and the resolution of the burst oscillator). Because embodiments of the present disclosure keep the bursts as short as possible (e.g., by bookending the bursts using the closest available SCL signal transitions), the accumulated phase error is thereby proportionally smaller (e.g., proportional to the minimized burst lengths).

In various embodiments, it is desirable to reduce utilization of communication link 205 as much as possible in order to limit power dissipation and to reduce risk of bus contention. As such, read-back of time-stamp data (e.g., transmitted by a slave device and received by a master device or a monitor device) can be organized such that only the significant bits of the time stamp are read back. For example, if the slave device has no burst oscillator, the master device is typically aware of the last bus-free condition where there were no IBIs for sufficient time to be sure there were no time-stamp events prior to that particular time. If the slave device transmits the time stamp by least significant bits first, then next significant bits, etc. (e.g., in reverse order), this organization allows the master device to ignore more significant bits that could relate to times earlier than that particular time, and the master device can terminate the read back before those more significant bits (e.g., irrelevant all-zero bits) are read.

In other embodiments where the slave device includes a local burst oscillator, the time-stamp data may be ordered by least significant bits first, burst oscillator time-stamp data (e.g., C1, then C2) before SCL time-stamp data (e.g., C0), and the slave device may be implemented with circuitry to generate a flag bit for each set of significant bits transmitted to the master device, where the flag bit for each transmission indicates whether the next transmission (e.g., the next byte of time-stamp data) is a continuation of the current C1, C2, or C0 data, is data from the next register (e.g., for C1 or C2), or is irrelevant (e.g., at the most significant bit for C0). As such, by reading the flags and tracking the current register (e.g., C1, C2, or C0), the master device can minimize the bus usage and terminate the read back upon the most significant (and not irrelevant, all zeros) bits of the time-stamp data. An example of such methods and circuitry is presented at least on pages 23-25 of U.S. Provisional Patent Application No. 62/244,333, filed Oct. 21, 2015, which is hereby incorporated by reference in its entirety.

Figure 17:
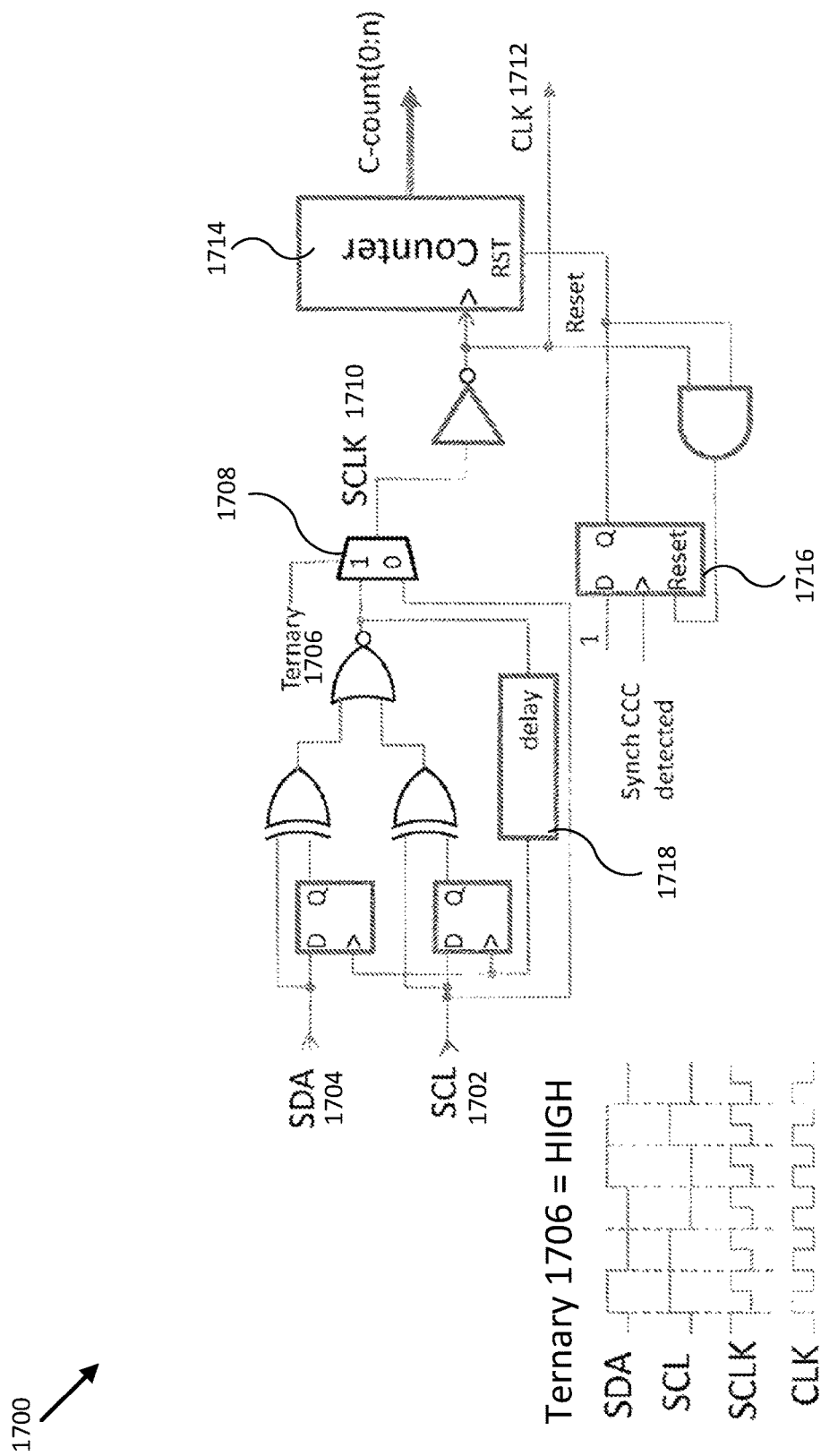
FIG. 17 is an example schematic of circuitry for implementation of a synchronized ternary protocol time-base that may be implemented at a slave device, in accordance with embodiments of the present disclosure.

FIG. 17 is an example schematic of circuitry 1700 for implementation of a synchronized ternary protocol timebase that may be implemented at a slave device, similar to slave device 204 implementing circuitry 400 of FIG. 4, in accordance with embodiments of the present disclosure. For example, as shown in FIG. 17, a slave device including circuitry 1700 may be configured to generate a uniform CLK signal 1712 from data transmitted along a communication link comprising SDA signal 1704 and SCL signal 1702 and using ternary data formats (e.g., to maximize data throughput). When in ternary modes (e.g., HDR_TSL or HDS_TSP), either a master or a slave device may drive both SDA 1704 and SCL 1702, and SCL may not toggle uniformly, as shown in FIG. 17. However, circuitry 1700 is able to derive a uniform CLK signal 1712 when bus/communication link 205 is in SDR or DDR modes as well as any Ternary modes, though at times with potentially increased jitter characteristics (e.g., as compared to an SCL derived CLK signal 1712, such as when ternary signal 1706 is LOW and multiplexer 1708 passes SCL signal 1702 through to counter 1714, as shown).

In some embodiments, delay 1718 may be configured to provide an approximate 20 ns propagation delay in order to ensure proper timing operation of the two flip flops receiving SCL signal 1702 and SDA signal 1704 and helping to generate SCLK signal 1710 (e.g., when Ternary signal 1706 is HIGH), as shown. In various embodiments, circuitry 1700 may be a part of Time Tracking/Trigger Control circuit 214 illustrated in FIG. 2. A flip flop 1716 outputs a sync pulse to counter 1714 in order to reset counter 1714 to all zeros when (Time) Sync CCC is detected. Counter 1714, after being reset to all zeroes, increments on every selected transition (e.g., on every falling edge) of SCLK clock signal 1710. The approach illustrated in FIG. 17 can be used to provide a uniform time reference CLK signal 1712 across all slave devices comprising the circuitry 1700 shown in FIG. 17.

Figure 18:
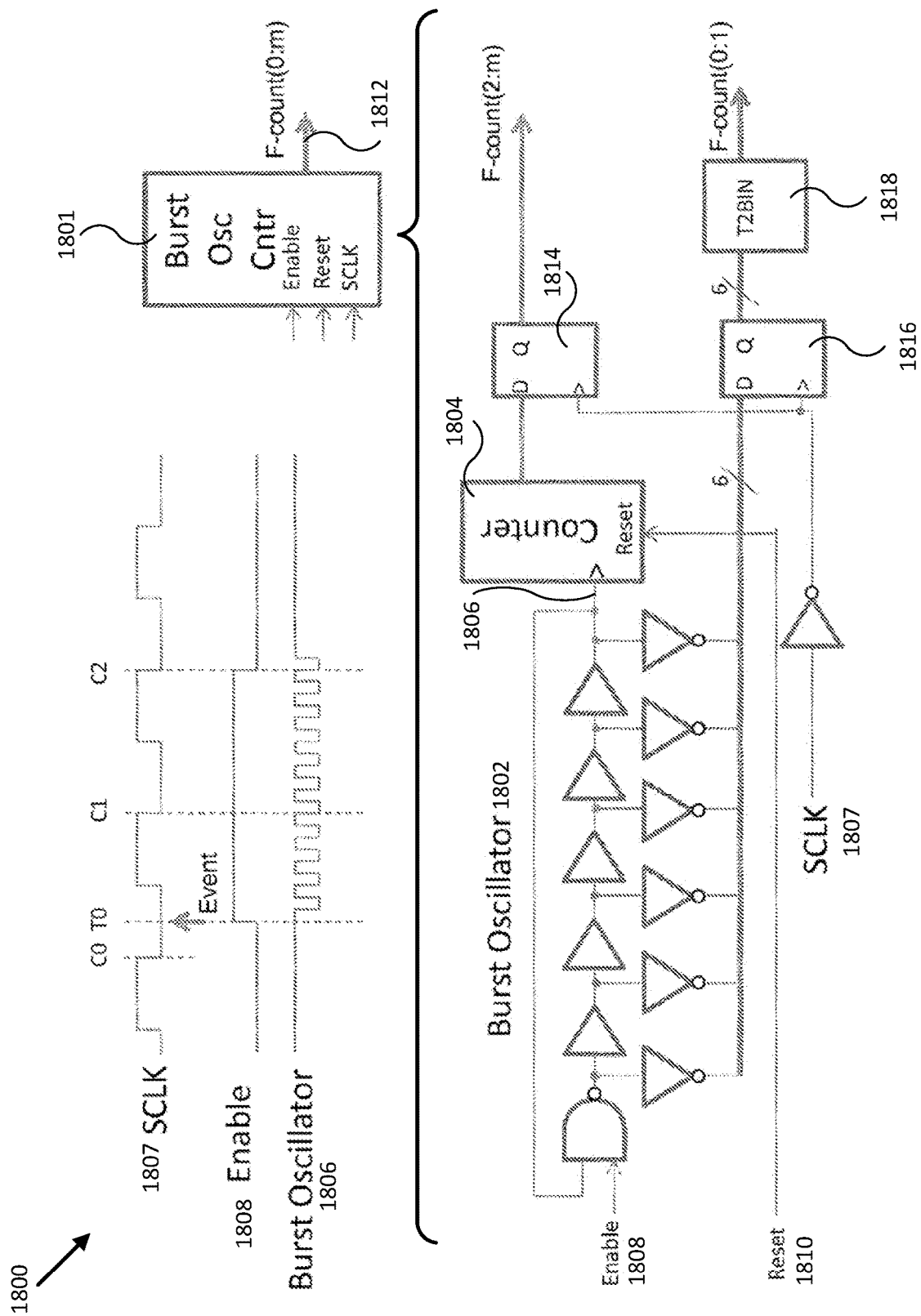
FIG. 18 is an example schematic of an oscillator circuit that may be implemented at a slave device for improving resolution of time synchronization, in accordance with embodiments of the present disclosure.

FIG. 18 is an example schematic 1800 of an oscillator circuit 1801 that may be implemented at slave device 204 for improving resolution of time synchronization, in accordance with embodiments of the present disclosure. For example, oscillator circuit 1801 may be configured to provide a relatively high/sub-nanosecond resolution for time of event measurements, as shown. In various embodiments, oscillator circuit 1801 may be a part of the Time Tracking/Trigger Control circuit 214 of the slave device 204 shown in FIG. 2. As illustrated in FIG. 18, oscillator circuit 1801 may include a burst oscillator 1802 and a counter 1804. Burst oscillator 1802 includes several serially connected inverters that generate a high speed clock signal 1806 when enable signal 1808 is at a high logic level. A frequency of the high speed clock signal 1806 is higher than a frequency of SCL clock signal 1807, as shown. Upon initiation by a reset signal 1810, counter 1804 starts counting selected transitions of high speed clock signal 1806. Output F(0:1) of burst oscillator 1802 (e.g., latched by flip flop 1816 and concatenated by T2BIN 1818) and m−1 bit outputs F(2:m) of counter 1804 (e.g., latched by flip flop 1814) form an output 1812 of oscillator circuit 1800. In various embodiments, burst oscillator 1802 may be configured to operate for a limited amount of time sufficient to make a certain number of measurements following detection of an event. Thus, burst oscillator 502 may be configured to consume a limited amount of power.

As noted herein, embodiments of the present disclosure implement a relatively precise timing and synchronization protocol to be used over multi-endpoint communication link formed by a two line serial data bus. In typical operation, a master device (e.g., master device 102/202) issues a CCC broadcast Time Sync command to synchronize all devices coupled to the communication link to a particular SCL signal falling edge/transition. Slave devices count all SCL and/or SDA transitions (e.g., depending on enabled ternary modes) after the Time Sync and use the SCL falling edges/transitions as time markers for time stamping events. Monitor devices (e.g., master or slave devices) count all SCL and/or SDA transitions (e.g., depending on enabled ternary modes) after Time Sync while monitoring the period of the SCL and/or SDA transitions against a relatively stable time base. Monitor devices monitor bus traffic for time stamp data, collect time stamp data, and determine timing of events against the stable time base.

Both time-stamping of events and timed triggering are provided by the disclosed embodiments. For example, a slave device may monitor a coupled sensor and record the time/count that a sensed event occurs and provide a corresponding time-stamp and any related sensor information over the communication link. A master device may issue a command for all slave devices in a group to initiate a particular operation at a precise relative time (count). Such initiation may include individualized time-delays on a per-slave device basis after which the operation is performed. FIGS. 19-25 illustrate how such timing and triggering techniques can be used to implement a system for acoustic object and/or gesture detection and/or recognition.

Figure 19:
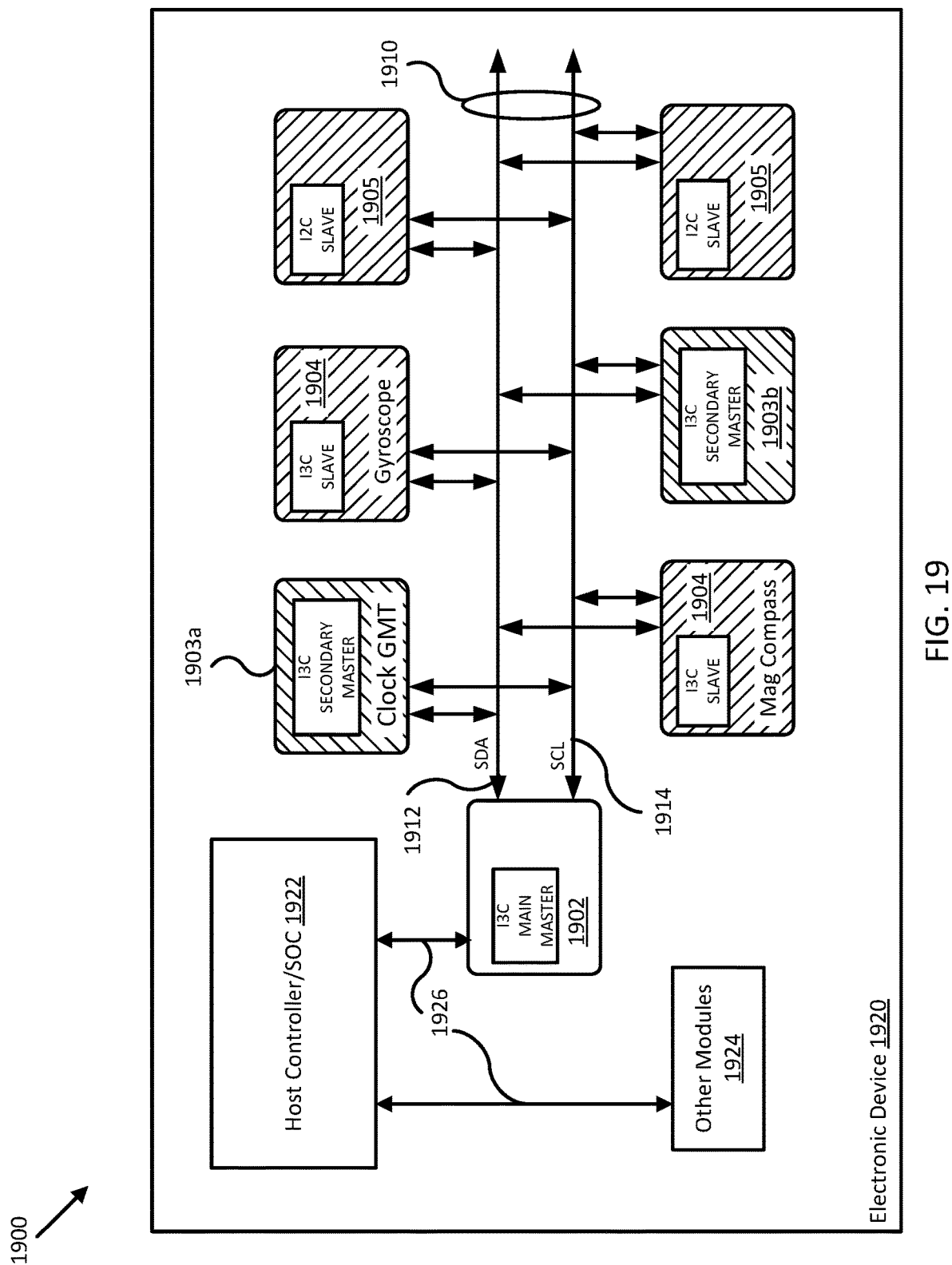
FIG. 19 is a schematic diagram of a system including I3C master devices interfaced with multiple slave devices via an I3C based communication link, in accordance with embodiments of the present disclosure.

FIG. 19 is a schematic diagram of a system 1900 including I3C master devices interfaced with multiple slave devices via an I3C based communication link, in accordance with embodiments of the present disclosure. As shown in FIG. 19, electronic device 1920 may include a host controller/system on chip (SOC) 1922 coupled to main master device 1902 and various other modules 1924 over one or more system buses 1926. Host controller 1922 may be implemented as a relatively high performance (e.g., relatively high power and/or expensive) logic device such as a conventional SOC, microcontroller, and/or other type of processor configured to control overall operation of electronic device 1920, Electronic device 1920 may be a portable or non-portable electronic device, such as a cell phone, tablet, laptop, remote control, and/or other portable electronic device, for example, or a television, a stereo receiver, a vehicle interface (e.g., as part of a dashboard, steering wheel, yoke, arm rest, or other user interface for a vehicle), a user interface for an elevator or other building or structure mechanism, a desktop computer and/or monitor, a point of sale, and/or other non-portable electronic device. Other modules 1924 may include one or more of a display, a user interface (e.g., one or more buttons, switches, joysticks, microphones, and/or other user interfaces), a touch screen display, a non-transitory memory and/or removable memory interface, a wired or wireless networking interface, a camera, a fingerprint sensor, a battery/battery charging circuit, and/or other modules configured to facilitate operation of electronic device 1920. In some embodiments, one or more of other modules 1924 may be coupled to communication link 1910 instead of system bus 1926 and have their communications to host controller 1922 moderated by main master 1902.

Main master device 1902 may be configured to control operation of communication link 1910 and interface with secondary master devices 1903a and 1903b, and various types of slave devices, such as I3C slave devices 1904 and I2C slave devices 1905. As such, main master 1902 and communication link 1910 may be configured to provide a simultaneous mixed mode or hybrid interface for a variety of different peripheral devices using different protocols to interface over communication link 1910. In various embodiments, master and slave devices of system 1900 and communication link 1910 may be implemented using methods and circuitry similar to those described with respect to master device 102, slave devices 106, and communication link 110 of FIG. 1 and master device 202, slave device 206, and communication link 205 of FIG. 2, in addition to other characteristics described with reference to FIGS. 3-16.

In various embodiments, particularly when electronic device 1920 is portable and relies on battery-supplied power, it can be desirable to put host controller 1922 into a sleep or low power mode while lower level functions are managed by main master 1902, so as to reduce overall system power draw. Host controller 1922 may then awake from the low power mode upon user interaction or other operational need, such as by notification by main master 1902 that one or more of the peripheral devices coupled to communication link 1910 has detected an event or performed an operation that requires higher level processing and/or distribution to other modules 1924, for example.

In some embodiments, each slave device of system 1900 may be implemented with a relatively low-speed (e.g., low power and/or less expensive) peripheral IC configured to perform corresponding peripheral operations and/or interface with communication link 1910, as described herein, and each master device may be implemented with a higher-speed processor, microcontroller, or IC that requires less power than host controller 1922, thereby allowing communication link 1910 and corresponding devices to operate at a significantly reduced power as compared to that required for host controller 1922. In specific examples, each slave device may be implemented with a relatively low performance/power programmable logic device (PLD) (e.g., field programmable gate arrays (FPGAs), complex programmable logic devices (CPLDs), field programmable systems on a chip (FPSCs), or other types of programmable devices), such as those fabricated using substantially a 350 nm process for example, and each master device may be implemented with a relatively higher performance/power PLD, such as those fabricated using substantially a 60 nm or higher resolution process, but where both types of devices are designed and configured to use significantly less power than that used by host controller 1922 when host controller 1922 is not in a low power mode.

As illustrated in FIG. 19, main master device 1902 may be interfaced with secondary master devices 1903*a*, 1903*b* and slave devices 1904, 1905 via communication link 1910. In some embodiments, SDA bus 1912 of communication link 1910 is a single wire bus employed to carry commands and/or data between main master device 1902 and secondary master devices 1903*a*, 1903*b* and slave devices 1904, 1905 using single ended signals in accordance with a communication protocol, such as I3C, and SCL bus 1914 is a single wire bus utilized to carry a single-ended clock signal that may be generated and/or controlled by main master device 1902. Such clock signal may be used as a timing reference for transmitting and receiving commands and/or data over communication link 1912.

Each secondary master device 1903*a*, 1903*b* or slave device 1904, 1905 may be coupled to a peripheral device (e.g., transducer, microphone, gyroscope, clock magnetometer/compass, global navigation satellite system (GNSS) receiver, other sensor, and the like) controlled by that secondary master device 1903*a*, 1903*b* or slave device 1904, 1905. In some embodiments, main master 1902 may be configured to hand off management of communication link 1910 (e.g., and/or any timing references or synchronization) to one or more of secondary master device 1903*a*, 1903*b* in order to reduce overall power usage (e.g., by allowing main master 1902 to enter a sleep or low power mode), for example, and/or to allow for a different time base or external or other type of synchronization process facilitated by that secondary master device taking control of communication link 1910. As such, different operational modes of communication link 1910, and corresponding different power usage levels, may be designed into system 1900 by providing varying performance main and secondary master devices coupled to communication link 1910.

For some embodiments, as discussed in more detail herein, main master device 1902 may issue a time synchronization command via SDA bus 1912 to synchronize local counts of selected transitions of clock signals (e.g., falling edges of clock signals) in different secondary master devices 1903*a*, 1903*b* and/or slave devices 1904, 1905 in order to accurately time-stamp readings (events) from devices (e.g., sensors) coupled to secondary master devices 1903*a*, 1903*b* and/or slave devices 1904, 1905. The time-stamped events locally stored at each secondary master device 1903*a*, 1903*b* and/or slave device 1904, 1905 may be provided (e.g., via SDA bus 1912) to main master device 1902 for calculation of a real time occurrence of each event, wherein a global real time can be accurately tracked by main master device 1902 based on transitions of the clock signal (e.g., signal carried by SCL bus 1914). In this way, events (e.g., measurements) from different sensors coupled to different secondary master devices 1903*a*, 1903*b* and/or slave devices 1904, 1905 can be accurately correlated in time at main master device 1902. For other embodiments, as discussed in more detail herein, multiple secondary master devices 1903*a*, 1903*b* and/or slave devices 1904, 1905 can initiate synchronized operations (e.g., emissions and/or measurements) via time synchronization triggering controlled by main master device 1902 (e.g., by sending an appropriate command via SDA bus 1912). Thus, the need for side communication channels between the devices coupled to communication link 1910 for synchronization of operations (events) can be eliminated.

As noted herein, embodiments of system 1900 may be configured to allow multiple devices coupled to communication link 1910 to initiate simultaneous operations (e.g., measurements, triggered actions) via I3C Time Sync triggering and/or synchronization, as described herein, thus eliminating any need for out of band or side channels to synchronize such operations. Advantageously, there is no need for time units or local clocks since all secondary master devices 1903*a*, 1903*b* and/or slave devices 1904, 1905 are clocked/triggered simultaneously by main master 1902.

Acoustic object and/or gesture detection and/or recognition is a special case of the more general case where Time Sync starts individual timers that each trigger an event at the end of their respective periods. The time delays associated with each slave device (and its peripheral device) are set by earlier Directed commands (e.g., default is zero delay). As an example, for acoustic tomography implemented in a cell phone (e.g., using one or more of devices 1902, 1903*a*, 1903*b*, 1904, 1905 of electronic device 1920), each slave device may drive one of an array of transducers (e.g., disposed on a surface of the cell phone) that generates an acoustic pulse at the end of the aforementioned individual time delay, in order to control its phase relative to the other transducer emissions for beamforming, for example. Shortly thereafter (e.g., approximately 1 ms or less for acoustic signals and ranges up to ⅓ meters), each transducer receives a reflected signal, where each feature of the corresponding waveform (e.g., that is within a preset time aperture and/or within one or more of a preset magnitude, derivative, second derivative, and/or other waveform characteristic limit(s) as set by an earlier command, such as according to manufacturer calibration, user input, and/or other preselection process), is time stamped and is recorded in a register, file, or other storage mechanism in the slave device.

After a preset sampling interval following the trigger, the master device may then poll each slave device and read back the stored data. After a number of such operations (e.g., in some embodiments including appropriate beamforming to help scan through certain spatial areas), there is sufficient information from the reflected waveform characteristics and the timings of the waveform characteristics, relative to those of the other waveforms and their characteristics, to render an image of the interior of a human abdomen, for example. Similar techniques can be used to detect and/or recognize objects (e.g., through pattern recognition and/or algorithmic training, for example) acoustically in air or water (e.g., similar to sonar), and a time series of such detections may be used to detect and/or recognize gestures acoustically (e.g., again, through pattern recognition, algorithmic training, and/or other algorithmic recognition techniques, for example, which may in some embodiments include manufacturer calibrations and/or directed user interaction and/or feedback). In addition, similar techniques can be used to detect and/or recognize objects and/or gestures using electromagnetic radiation (e.g., radar, where the array of transducers takes the form of an array of antennas configured to emit and receive electromagnetic signals, perhaps in the various GHz bands, including those bands commonly used for wireless data communication and/or networking).

In various embodiments, propagation delay along a communication link implemented according to the disclosed embodiments may be compensated for by manufacturer calibration (e.g., simulation coupled with a known spatial distribution of devices along the communication link) and/or by reflectometry performed by one or more devices coupled to the communication link. For example, known or calibrated or measured propagation delays may be compensated for on a per-device basis when converting time stamps to system times or relative times, such as retaining a lookup table of such delays and inserting appropriate compensating trigger delays and/or time stamp adjustments as needed depending on the type of synchronous operation of the system. For example, with respect to acoustic object and/or gesture detection and/or recognition, a master device may be configured to adjust trigger delays for emitted acoustic waves to compensate for SCL clock signal propagation delays along the SCL bus and/or to adjust received time stamps for detected events to compensate for such signal propagation delays.

For master device polling (e.g., where IBI is not used), in order for the slave devices to use the SCL clock (e.g., provided by the master device) as a uniform time reference, the master device may be configured to maintain a continuously switching SCL during the sampling interval. In such embodiments, the master device may be configured to issue a series of CCC commands (e.g., 0x7E's, for example) where the master drives SDA low during ACK so that the period of the SCL transitions can be uniform. In some embodiments, main master 1902 may be able to run SCL 1914 at 12 MHz, and secondary master 1903*a* may be able to run SCL 1914 at 10.5 MHz, if given control of communication link 1910. Prior to being granted Mastership of communication link 1910, secondary master 1903*a* may be configured to clear its own SCL counter and timestamp the next two falling edges of its own clock (e.g., at 10.5 MHz) with respect to the current 12 MHz SCL clock provided by main master 1902. Subsequently, secondary master 1903*a* maintains the count of its own 10.5 MHz clock and that of the incoming 12 MHz SCL from main master 1902 until main master 1902 abdicates, whereupon secondary master 1903*a* assumes Mastership of communication link 1910 and registers the last falling edge of the 12 MHz SCL driven by main master 1902. Through such process, the system timebase may be maintained through hand off of Mastership of communication link 1910 to and from secondary master 1903*a*, such as to allow for temporary lower power operation of communication link 1910 and the various coupled devices.

Figure 20:
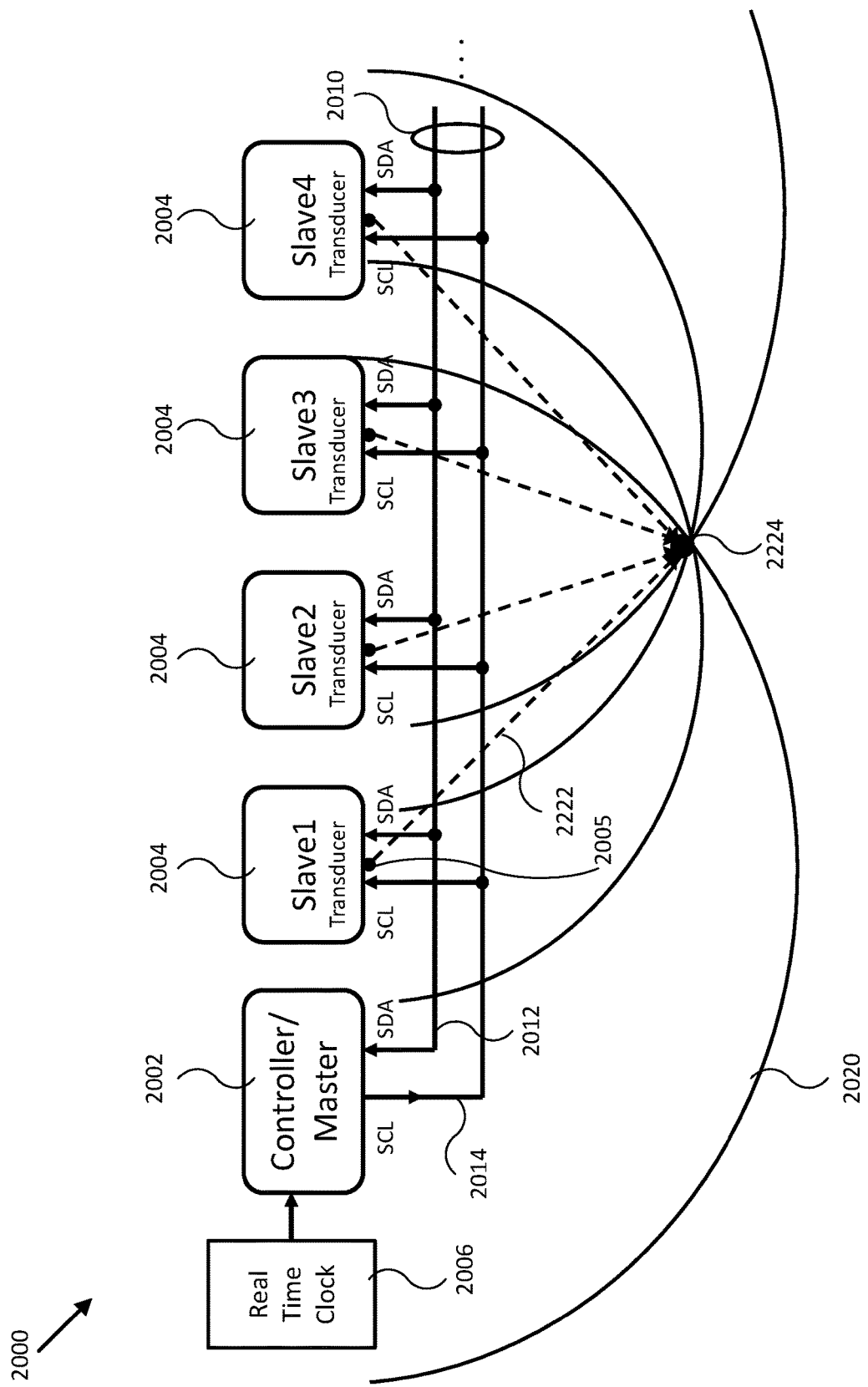
FIG. 20 is a schematic diagram that illustrates an I3C master device interfaced with multiple slave devices via an I3C based communication link and configured to implement acoustic object and/or gesture detection and/or recognition, in accordance with embodiments of the present disclosure.

FIG. 20 is a schematic diagram 2000 that illustrates an I3C master device 2002 interfaced with multiple slave devices 2004 via an I3C based communication link 2010 and configured to implement acoustic object and/or gesture detection and/or recognition, in accordance with embodiments of the present disclosure. For example, main master device 1902 of system 1900 may be replaced with controller/master 2002 (e.g., and real time clock 2006), communication link 1910 may be replaced with communication link 2010, and secondary master devices 1903*a*, 1903*b* and slave devices 1904, 1905 may be replaced with slave devices 2004, in order to implement acoustic object and/or gesture detection and/or recognition within or as a portion of electronic device 1920/system 1900 of FIG. 19. In addition, elements of FIG. 20 roughly correspond to similar elements depicted in FIG. 1 and can be implemented using similar techniques and/or circuitry.

More specifically, FIG. 20 shows controller/master device 2002 coupled to a real time clock source 2006 (e.g., that generates a clock signal for master device 2002) and interfaced with multiple slave devices 2004, each including an acoustic transducer and transducer element 2005, and the group forming an array of acoustic transducers arranged to perform object and/or gesture detection and/or recognition, as described herein. Also shown in FIG. 20 is object 2224 ensonified by acoustic waves 2020 along nearest distance paths 2222. In various embodiments, master device 2002 may be configured to transmit individual trigger time delays to each of slave devices 2004, where the individual trigger time delays are configured to beamform the acoustic waves 2020 generated and emitted by transducer elements 2005 to, for example, focus within a particular spatial area relative to slave devices 2004 (e.g., such as within a particular distance and across a particular solid angle relative to a surface of electronic device 1900, or at an expected or last detected position of object 2224), to provide a relatively broad spatial search area, to scan through a preset spatial area with relatively high gain (e.g., to provide higher spatial resolution relative to a given noise floor), and/or to provide other benefits associated with beamformed acoustic detection and/or recognition techniques. In some embodiments, the individual time delays may all be set to zero, defaulted to zero, or flagged as unset.

Once such individual time delays are established, master device 2002 may be configured to transmit a CCC broadcast Time Sync to synchronize operation of all slave devices 2004 and to provide an SCL signal across SCL line 2014 of communication link 2010, at least until all slave devices 2004 have emitted their respective acoustic waveforms 2020 at the end of their respective time delays. After each time delay has elapsed, the corresponding slave device 2004 may then trigger its individual transducer to emit a corresponding acoustic wave 2020 from its transducer element 2005, at a system time set by that slave device's individual time delay, as established by master device 2002. Each acoustic wave will travel towards object 2224 along its corresponding nearest distance path 2222, and, upon contacting object 2224, generate a reflected acoustic wave. Object 2224 may correspond to a stylus, a writing implement (e.g., a pen or pencil), a fingertip, a facial feature (e.g., a nose, lip, eyelid, eyebrow, chin, and/or other facial feature), and/or other object or object feature in general line of sight view of slave devices 2004 and/or their respective acoustic transducer elements 2005.

Figure 21:
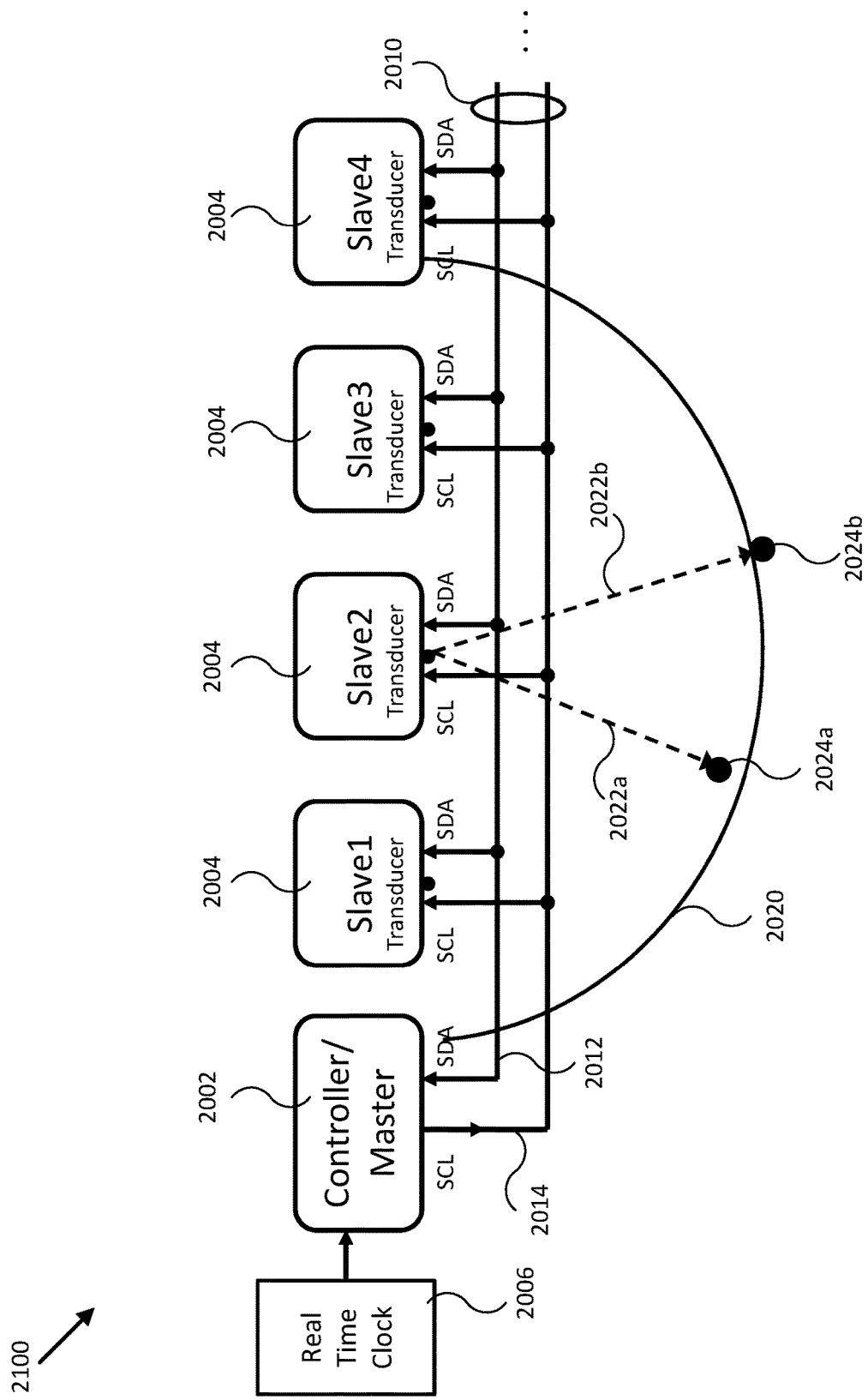
FIG. 21 is a schematic diagram that illustrates an I3C master device interfaced with multiple slave devices via an I3C based communication link and configured to implement acoustic object and/or gesture detection and/or recognition, in accordance with embodiments of the present disclosure.

FIG. 21 is a schematic diagram 2100 that illustrates I3C master device 2002 interfaced with multiple slave devices 2004 via an I3C based communication link 2010 and configured to implement acoustic object and/or gesture detection and/or recognition, in accordance with embodiments of the present disclosure. Also shown in FIG. 20 are objects 2024*a* and 2024*b* ensonified by acoustic wave 2020 along respective nearest distance paths 2022*a* and 2022*b*. In the embodiment shown in FIG. 20, master device 2002 and slave devices 2004 are configured to detect and/or recognize multiple objects 2024*a* and 2024*b* substantially simultaneously. More specifically, master device 2002 and slave devices 2004 are shown performing a first step to perform echo triangulation for object and/or gesture detection and/or recognition by emitting acoustic wave 2020 towards objects 2024*a* and 2024*b* (e.g., as an alternative to the multiple/beamformed emitted acoustic waves 2020 shown in FIG. 20).

For example, such single acoustic wave 2020 may be used in place of multiple acoustic wave emissions (as shown in FIG. 20) such that the resulting reflected acoustic waves (e.g., one from each object 2024*a*, 2024*b*), as detected at the array of slave devices 2004, provide sufficient information to detect a relative position and/or series of relative positions (e.g., using multiple single acoustic wave emissions) of objects 2024*a*, 2024*b* to perform object and/or gesture detection and/or recognition. For single hand gestures, the fingertips are typically the part of the hand nearest to transducer elements 2004 and therefore will generate the initial and often strongest portion of any reflected acoustic wave. The detected relative positions of the fingertips (e.g., relative to the array of slave devices 2004), and particularly a time series of such relative position detections, allows embodiments of the present disclosure to reliably detect and/or recognize gestures. In other embodiments, a stylus or pencil point may be used in place of fingertips to generate such gestures. In still further embodiments, objects 2024*a* and 2024*b* may correspond to various features of a human face, such as a nose, lips, chin, eyebrows, corneas, and/or other features, and the detected and recognized positions and gestures may correspond to a resting face, raised eyebrows, a smile, talking, a frown, crying, and/or other facial gestures.

Figure 22:
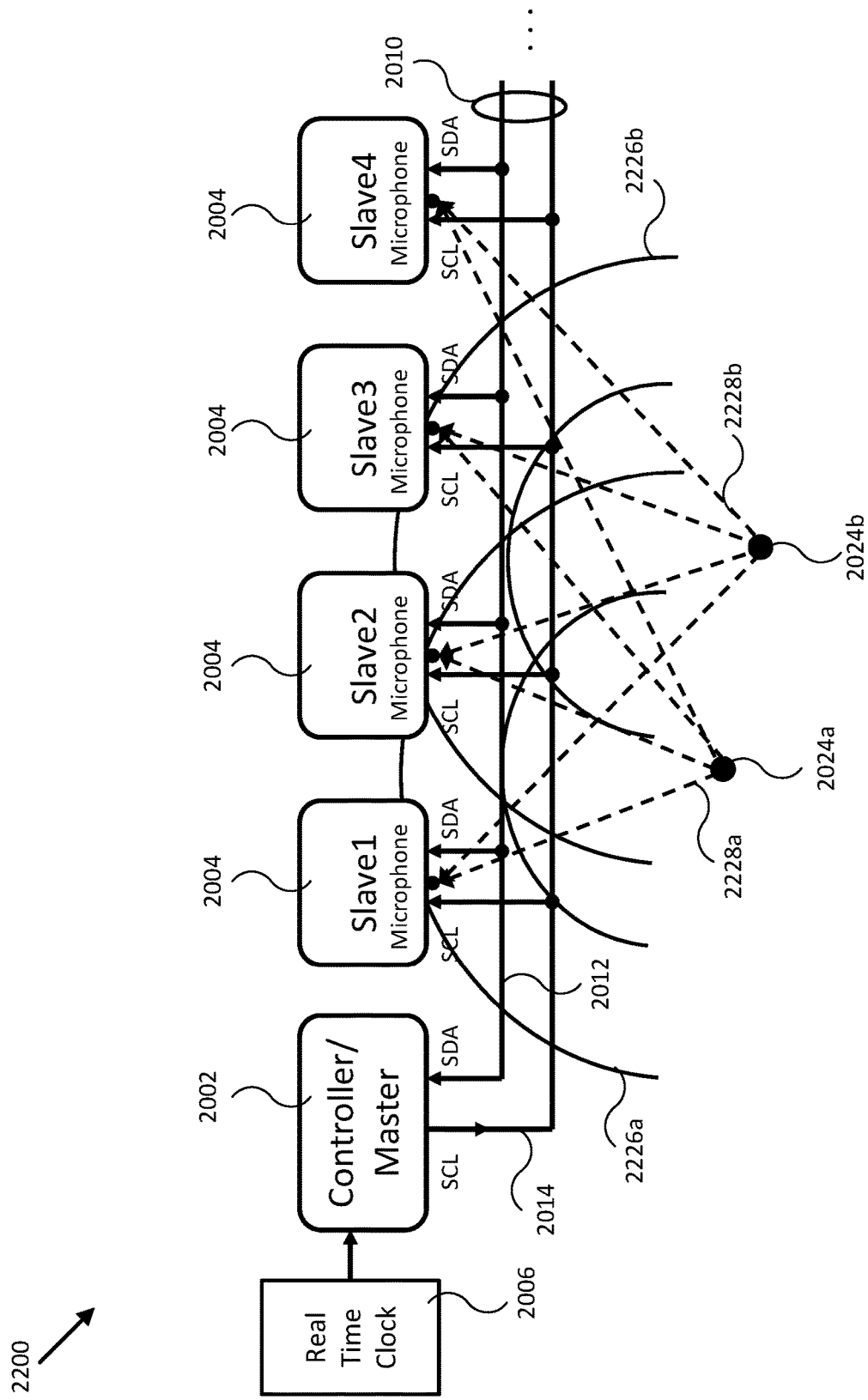
FIG. 22 is a schematic diagram that illustrates an I3C master device interfaced with multiple slave devices via an I3C based communication link and configured to implement acoustic object and/or gesture detection and/or recognition, in accordance with embodiments of the present disclosure.

FIG. 22 is a schematic diagram 2200 that illustrates I3C master device 2002 interfaced with multiple slave devices 2004 via an I3C based communication link 2010 and configured to implement acoustic object and/or gesture detection and/or recognition, in accordance with embodiments of the present disclosure. In FIG. 22, slave devices 2004 are shown as each including a microphone. In some embodiments, such microphones are implemented by the same transducers and transducer elements as those depicted in FIGS. 20 and 21. In other embodiments, slave devices 2004 may be implemented with transducers and transducer elements configured primarily to emit acoustic waves and/or particular characteristics of acoustic waves (e.g., such as in a particularized frequency band, according to a particular spatial gain distribution, at a particular power level, and/or other characteristics of acoustic waves) and microphones and corresponding microphone elements configured primarily to receive and detect acoustic waves and characteristics of acoustic waves (e.g., such as in a particularized frequency band or bands, according to a particular spatial gain distribution, at a particular sensitivity level, and/or according to other characteristics of acoustic waves).

In further embodiments, some of slave devices 2004 may be implemented with transducers and transducer elements configured primarily to emit acoustic waves and/or particular characteristics of acoustic waves, and different ones of slave devices 2004 may be implemented with microphones and corresponding microphone elements configured primarily to receive and detect acoustic waves and characteristics of acoustic waves. In various embodiments, slave devices 2004 may be configured to emit, receive, detect, and/or determine acoustic waveforms and characteristics of acoustic waveforms, emit waveforms and/or waveform characteristics according to specified trigger timings (e.g., specified by master device 2002), and to provide time stamps corresponding to received acoustic waveforms and/or characteristics of the acoustic waveforms.

Also shown in FIG. 22 are objects 2024*a* and 2024*b* generating respective reflected acoustic waves 2226*a* and 2226*b* along corresponding nearest distance paths 2228*a* and 2228*b*. In the embodiment shown in FIG. 22, master device 2002 and slave devices 2004 are configured to detect and/or recognize multiple objects 2024*a* and 2024*b* substantially simultaneously. More specifically, master device 2002 and slave devices 2004 are shown performing a second step to perform echo triangulation for object and/or gesture detection and/or recognition by receiving and detecting acoustic waves 2226*a* and 2226*b* reflected from respective objects 2024*a* and 2024*b*, time stamping the acoustic wave detections, and providing the time stamps and/or other waveform characteristics to master device 2002 over SDA line 2012. In some embodiments, reflected acoustic waves 2226*a* and 2226*b* may be generated in response to a time series of single emitted acoustic waves 2020 (e.g., from slave device "2" as shown in FIG. 21). In other embodiments, reflected acoustic waves 2226*a* and 2226*b* may be generated in response to multiple and/or beamformed emitted acoustic waves 2020, and/or a time series of such emitted acoustic waves 2020, as shown in FIG. 20. In further embodiments, reflected acoustic waves 2226*a* and 2226*b* may be generated in response to acoustic waves generated by ambient environmental sources (e.g., ambient talking, footsteps, clapping, wind noise, thunder, tire squealing, and/or other ambient and/or environmental sources), such as in passive sonar or radar and similar techniques.

In some embodiments, master device 2002 may be configured to provide an SCL signal across SCL line 2014 of communication link 2010 to slave devices 2004 starting from an initial Time Sync transmitted across SDA line 2012 of communication link 2010 through to a preset time aperture configured to allow enough time for emitted acoustic waves 2020 to travel from one or more slave devices 2004 to objects 2024*a* and 2024*b* and generate reflected acoustic waves 2226*a* and 2226*b*, for reflected acoustic waves 2226*a* and 2226*b* to travel from objects 2024*a* and 2024*b* to slave devices 2004, and for slave devices 2004 to detect and time stamp reflected acoustic waves 2226*a* and 2226*b*. In other embodiments, master device 2002 may be configured to provide an SCL signal across SCL line 2014 of communication link 2010 to slave devices 2004 up through the time when all acoustic waves 2020 have been emitted from slave devices 2004 (e.g., after all time delays have elapsed), end or pause the SCL signal, and then wait for one or more of slave devices 2004 to transmit an IBI (e.g., across SDA line 2012 of communication link 2010) in response to detecting a reflected acoustic wave 2226*a* or 2226*b*, at which time master device 2002 may detect the IBI and restart the SCL signal to read back the individual time stamps and event characteristics from slave devices 2004, all synchronized to a stable and continuous system time.

In embodiments where master device 2002 pauses the SCL signal, master device 2002 may be configured to keep track of the elapsed system time (e.g., the SCL count) locally using the clock signal provided by real time clock 2006, such that the restarted SCL signal is synchronous with the SCL signal prior to the pause (e.g., the transitions of the signals are synchronous), but without transmitting the SCL signal across SCL line 2014. As such, master device 2002 is able to maintain the system time throughout the process, and to determine the relative times between events detected by the individual slave devices 2004 and the individual elapsed times between the emissions of acoustic waves 2020 and detections of reflected waves 2226a and/or 2226b, without expending the power to maintain the SCL signal on SCL line 2014 throughout the process. In embodiments where slave devices 2004 include local burst oscillators, slave devices 2004 may be configured to use the local burst oscillator signal and the SCL signal (either a maintained SCL signal or an IBI restarted SCL signal) to provide a higher resolution time stamp of a detected event (e.g., detection of reflected acoustic waves 2226a and/or 2226b). Further detail is provided in FIGS. 23 and 24.

Figure 23:
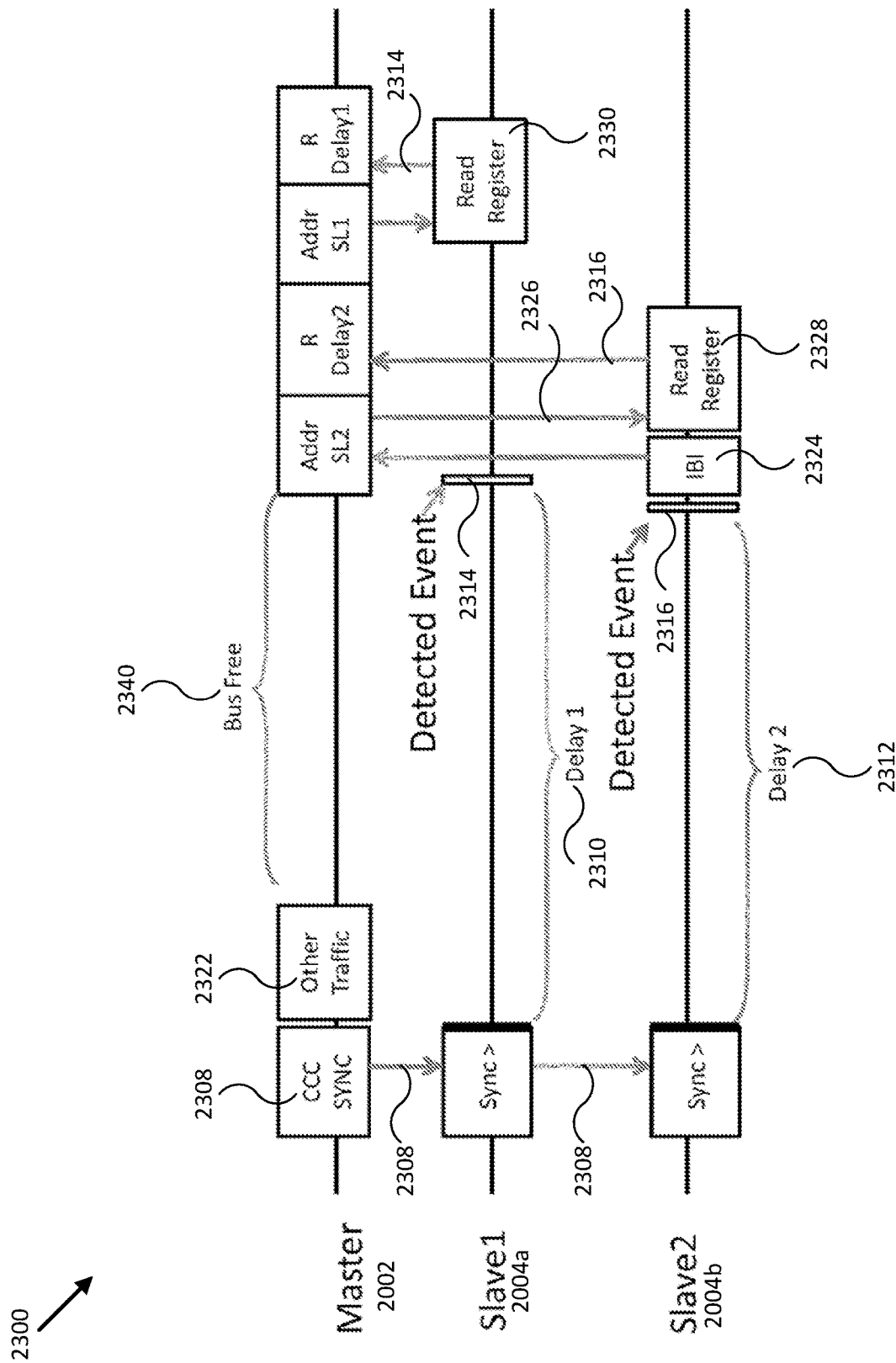
FIG. 23 is a diagram illustrating capturing and reading time of events by a master device from multiple slave devices, in accordance with embodiments of the present disclosure.

FIG. 23 is a diagram 2300 illustrating capturing and reading time of events by master device 2002 from multiple slave devices 2004a, 2004b, in accordance with embodiments of the present disclosure. As illustrated in FIG. 23, master device 2002 may broadcast a Time Sync CCC 2308 to slave devices 2004a, 2004b and then enter a bus free mode 2340 (e.g., after transmission of other traffic 2322 is complete) where transmission of the SCL clock signal is paused (e.g., to reduce power usage/dissipation). Master device 2002 may track the time period between a Time Sync Marker generated when Sync CCC 2308 is generated by master device 2002 and when transmission of IBI 2324 by slave device 2004b is detected by master device 2002. Time delays 2310, 2312 between the Time Sync Marker and detection of an event (e.g., detection of acoustic waveforms 2226a and/or 2226b) at each slave device may be derived by master device 2002 upon restart of the SCL clock signal, as described herein.

When a first-in-time event 2316 (e.g., detection of reflected acoustic waves 2226a and/or 2226b) is detected at slave device 2004b, slave device 2004b issues IBI 2324 and, in some embodiments, enables a local burst oscillator. Master device 2002 detects IBI 2324 and restarts the SCL clock signal (not shown in FIG. 23) and provides it to slave devices 2004a and 2004b on the SCL bus. Slave devices 2004a and 2004b thereafter count the restarted SCL clock signal transitions synchronously, and this count is also monitored by master device 2002. Slave device 2004b uses the next two SCL clock signal transitions and, in some embodiments, a local burst oscillator enabled by the detection of the event, to time stamp event 2316. Slave device 2004b then stores the time stamp and/or other waveform characteristics in a register (e.g., read register 2328) and, upon request 2326, the time stamp and/or other waveform characteristics of event 2316 are read back from register 2328 to master device 2002.

During this time, second-in-time event 2314 is detected at slave device 2004a, as shown. Because the SCL clock signal has already been restarted by IBI 2324 issued by slave device 2004b, slave device 2004a proceeds as outlined in the description with respect to FIGS. 7 and 8, time stamps event 2314 (e.g., in some embodiments with the added resolution provided by a local burst oscillator), stores the time stamp and/or other waveform characteristics of event 2314 in a register (e.g., read register 2330), and, upon request, the time stamp and/or other waveform characteristics of event 2314 are read back from register 2330 to master device 2002, as shown. Because master device 2002 has kept a local count of the SCL clock transitions between the Time Sync Marker and the restart of the SCL clock signal in response to issuance of IBI 2324 (e.g., has kept track of the system time), master device 2002 may determine time delays 2310, 2312 between the Time Sync Marker and detection of events 2314, 2316 at slave devices 2004a, 2004b, by, for example, adding the locally counted/monitored system time period between the Time Sync Marker and IBI 2324 to the time stamp (e.g., count C1) provided by the slave devices.

Figure 24:
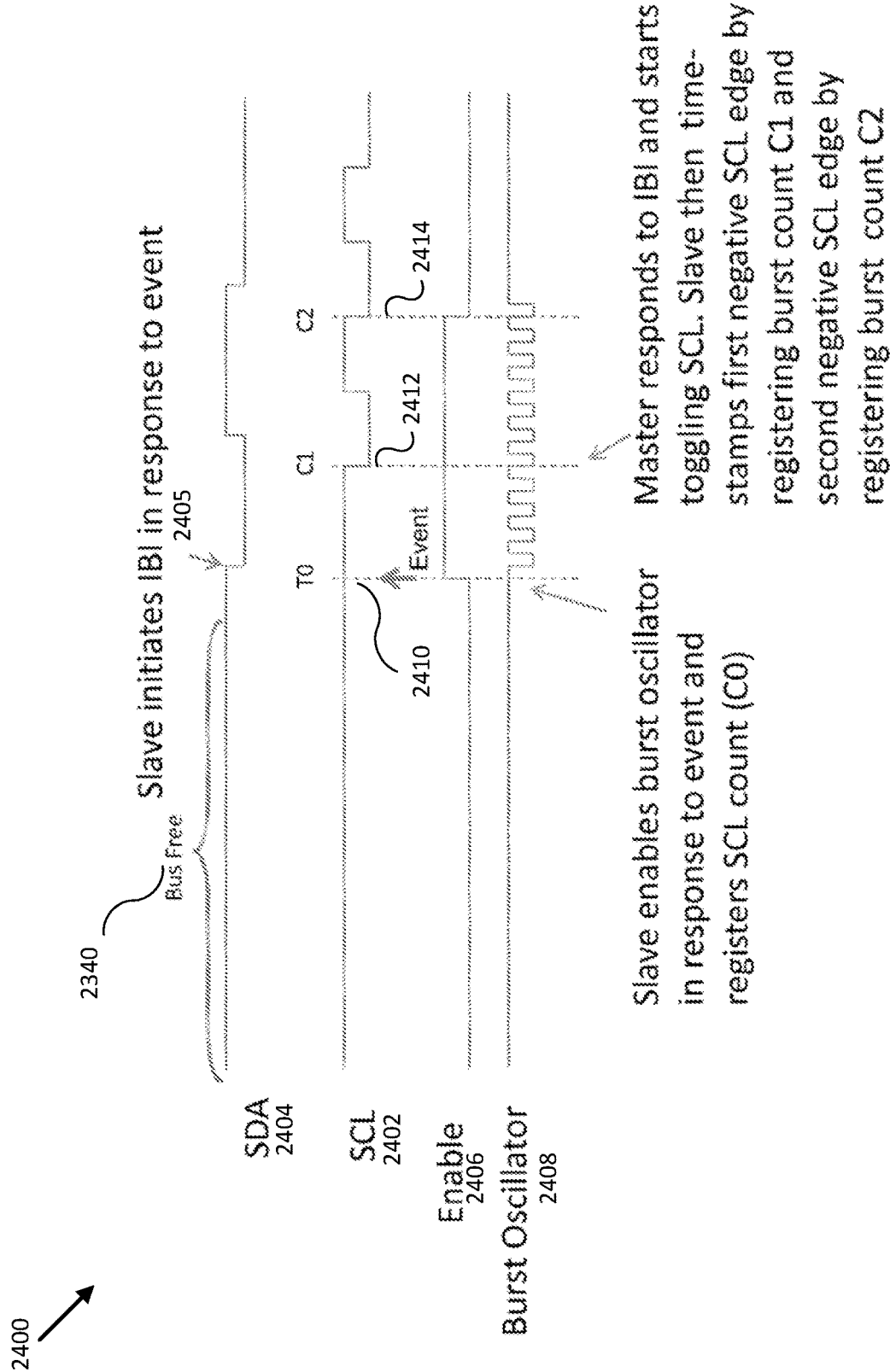
FIG. 24 is a diagram illustrating providing time of events by a slave device to a master device, in accordance with embodiments of the present disclosure.

FIG. 24 is a diagram 2400 illustrating providing time of events by a slave device to a master device, in accordance with embodiments of the present disclosure. More specifically, diagram 2400 shows the signals operating to allow slave device 2004b of FIG. 23 to detect and time stamp event 2316 after the SCL clock signal has been paused or stopped by master device 2002. For example, during bus free mode 2340, SDA 2404 and SCL 2403 may be kept high. Upon slave device 2004b detecting event 2316 at time T0, slave device pulls enable signal 2406 high, as indicated by marker 2410, burst oscillator signal 2408 begins to oscillate, and slave device 2004b issues IBI 2324, which pulls down SDA signal 2404, as indicated by market 2405. In response, master device 2002 restarts the SCL clock signal 2402, which begins to transition as indicated by markers 2412 and 2414. By keeping count of the burst oscillator transitions between T0 and C1, and C1 and C2, slave device 2004b may provide these counts to master device 2002, which can determine the system time corresponding to C1 and use this time and the various burst oscillator counts to determine the system time corresponding to T0 (e.g., the time of the detected event, such as detection of reflected acoustic waves 2226a and/or 2226b).

Figure 25:
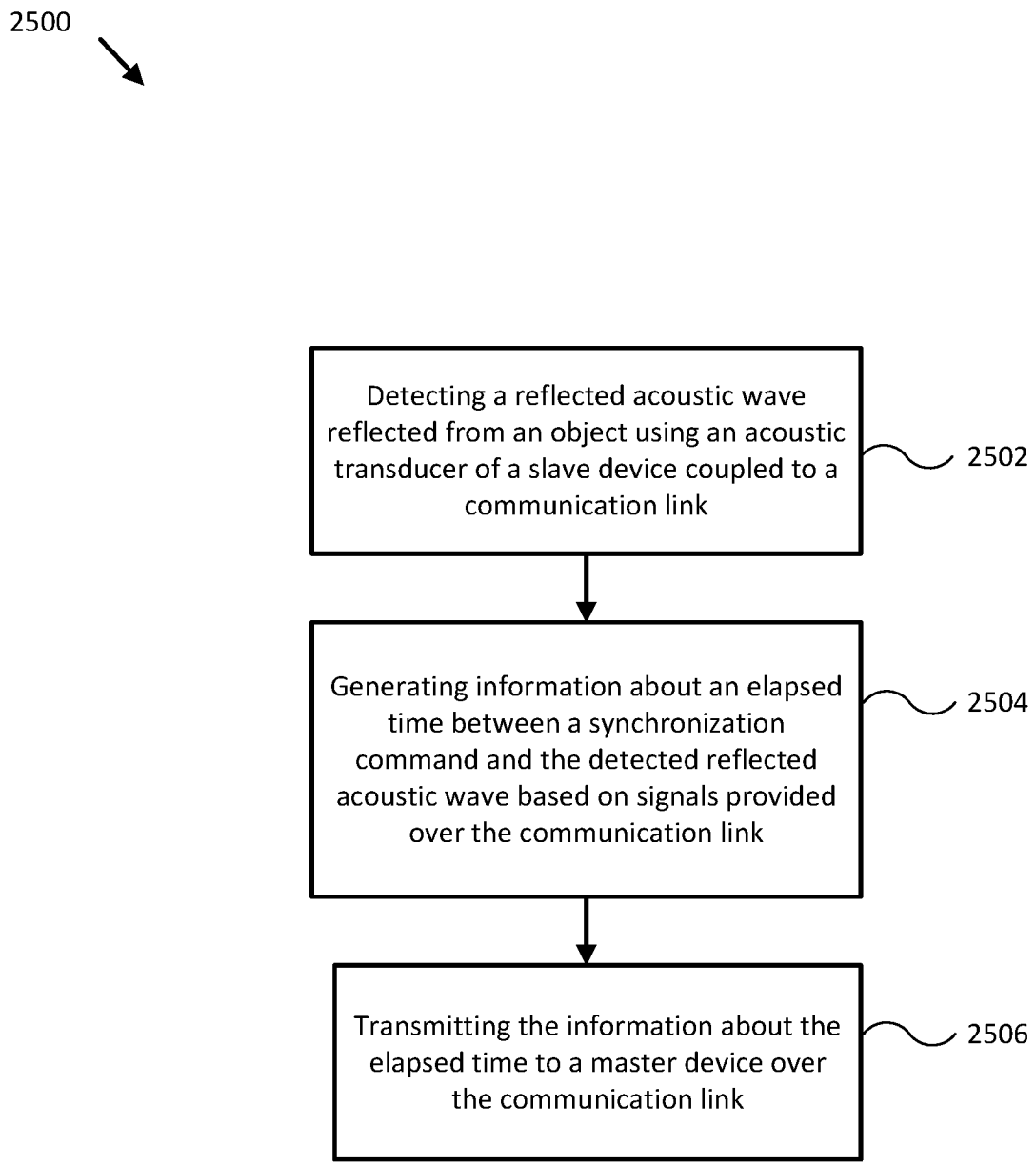
FIG. 25 is a flow chart illustrating a method for acoustic object and/or gesture detection and/or recognition, in accordance with embodiments of the present disclosure.

FIG. 25 is a flow chart illustrating a method for acoustic object and/or gesture detection and/or recognition, in accordance with embodiments of the present disclosure.

In block 2502, a logic device detects a reflected acoustic wave reflected from an object using an acoustic transducer of a slave device coupled to a communication link. For example, slave device 2004 coupled to communication link 2010 in FIG. 22 may be configured to detect reflected acoustic waves 2226a and/or 2226b reflected from objects 2024a and/or 2024b using an acoustic transducer (e.g., a microphone or transducer, as described herein) of slave device 2004. In various embodiments, slave device 2004 may be configured to receive SCL clock signal over single line SCL bus 2014 and a synchronization command over single line SDA bus 2012, both of communication link 2010.

In block 2504, a logic device generates information about an elapsed time between a synchronization command and the detected reflected acoustic wave based on signals provided over the communication link. For example, slave device 2004 may be configured to generate information about an elapsed time between a synchronization command received prior to block 2502 and the reflected acoustic wave detected in block 2502, based, at least in part, on a number of selected transitions of the SCL clock signal between the synchronization command and the detected reflected acoustic wave.

In block 2506, a logic device transmits the information about the elapsed time to a master device over the communication link. For example, slave device 2004 may be configured to transmit the information about the elapsed time generated in block 2504 to master device 2002 over SDA bus 2012 of communication link 2010. Upon receiving such information from one or more slave devices, master device 2002 may be configured to determine a position of the object, and with a time series of such information and/or positions of one or more objects, can detect and/or recognize a gesture associated with the object, such as a gesture indicating a desire to turn or scroll past a displayed page, a gesture (e.g., of a face) to pick up or hang up a call, a gesture corresponding to writing or a signature, and/or other gestures, for example.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
a slave device comprising an acoustic transducer and configured to receive a clock signal and a synchronization command over a communication link, wherein the communication link comprises a single clock line that carries the clock signal and a single data line that carries the synchronization command, and wherein the slave device is configured to:
  detect a reflected acoustic wave reflected from an object using the acoustic transducer,
  generate information about an elapsed time between the synchronization command and the detected reflected acoustic wave based, at least in part, on a number of selected transitions of the clock signal between the synchronization command and the detected reflected acoustic wave, and
  transmit the information about the elapsed time over the single data line to a master device coupled to the communication link.

2. The system of claim 1, wherein:
the slave device comprises an oscillator circuit configured to generate an oscillator signal having an oscillator frequency higher than a clock frequency of the clock signal, and
the slave device is configured to count a number of selected transitions of the oscillator signal occurring after the detected reflected acoustic wave is detected at the slave device and to generate the information about the elapsed time based, at least in part, on the number of selected transitions of the oscillator signal.

3. The system of claim 1, wherein the slave device is configured to:
receive a first delay setting information via the communication link;
track a number of selected transitions of the clock signal after the synchronization command;
generate an emitted acoustic wave emitted at least partially towards the object responsive to the number of selected transitions reaching a first delay setting indicated by the first delay setting information.

4. The system of claim 3, wherein the slave device comprises an oscillator circuit configured to generate an oscillator signal having an oscillator frequency higher than a clock frequency of the clock signal, and wherein the slave device is configured to:
receive a second delay setting information via the communication link;
generate the oscillator signal using the oscillator circuit;
track a number of selected transitions of the oscillator signal that occur after the number of selected transitions of the clock signal reach the first delay setting; and
generating the emitted acoustic wave further responsive to the number of selected transitions of the oscillator signal reaching a second delay setting indicated by the second delay setting information.

5. The system of claim 1, wherein the slave device is configured to:
generate an in-band interrupt over the single data line in response to the detected reflected acoustic wave;
receive a request for reading the information about the elapsed time; and
transmit, in response to the request, the information about the elapsed time to the master device.

6. The system of claim 1, further comprising the master device, wherein:
the master device is configured to receive the information about the elapsed time and to derive an event time corresponding to when the reflected acoustic wave was detected at the slave device based on the information about the elapsed time.

7. The system of claim 1, further comprising the communication link, wherein the master device is configured to:
transmit the synchronization command over the single data line and the clock signal over the single clock line; and receive the information about the elapsed time and to derive an event time corresponding to when the acoustic wave was detected at the slave device based on the information about the elapsed time and numbers of selected transitions of the clock signal occurring between frequency changes of the clock signal that are tracked at the master device.

8. The system of claim 1, further comprising a plurality of slave devices, each configured to receive the clock signal and the synchronization command over the communication link, and each comprising one of a corresponding plurality of acoustic transducers, wherein the acoustic transducer and the plurality of acoustic transducers are arranged in a beamforming transducer array, and wherein each one of the plurality of slave devices is configured to:
detect the reflected acoustic wave reflected from the object,
generate individual information about an individualized elapsed time between the synchronization command and the detected reflected acoustic wave based, at least in part, on an individual number of selected transitions of the clock signal between the synchronization command and the detected reflected acoustic wave, and
transmit the individual information about the elapsed time over the single data line to a master device coupled to the communication link.

9. The system of claim 8, wherein the master device is configured to:
receive the individual information about the elapsed times;
derive a set of event times corresponding to when the acoustic wave was detected at the plurality of slave devices based on the individual information about the elapsed times; and
determine a position of the object based, at least in part, on the set of event times.

10. The system of claim 9, wherein:
the plurality of slave devices are configured to iteratively generate a time series of individual information corresponding to a time series of detected reflected acoustic waves reflected from the object and to transmit the time series of individual information to the master device over the single data line; and
the master device is configured to:
receive the time series of individual information;
derive a time series of sets of event times corresponding to when the acoustic waves were detected at the plurality of slave devices, based on the time series of individual information;
determine a time series of positions of the object based, at least in part, on the time series of sets of event times; and
detect a gesture associated with the object based, at least in part, on the time series of positions of the object.

11. A system comprising:
a master device configured to transmit a clock signal and a synchronization command over a communication link to a plurality of slave devices, wherein the communication link comprises a single clock line that carries the clock signal and a single data line that carries the synchronization command, and wherein the master device is configured to:
receive, from each slave device, information about an elapsed time between the synchronization command and a detection of a reflected acoustic wave reflected by an object and detected at the slave device, based, at least in part, on a number of selected transitions of the clock signal between the synchronization command and the detection of the reflected acoustic wave at the slave device;
derive a set of event times corresponding to when the acoustic wave was detected at the plurality of slave devices based on the received information about the elapsed times; and
determine a position of the object based, at least in part, on the set of event times.

12. The system of claim 11, wherein the master device is configured to:
receive a time series of the information about the elapsed times;
derive a time series of sets of event times corresponding to when the reflected acoustic waves were detected at the plurality of slave devices, based on the time series of the information about the elapsed times;
determine a time series of positions of the object based, at least in part, on the time series of sets of event times; and
detect a gesture associated with the object based, at least in part, on the time series of positions of the object.

13. The system of claim 11, wherein the master device is configured to:
transmit first delay setting information to the plurality of slave devices via the communication link, wherein the first delay setting information comprises a set of first delay settings for the plurality of slave devices that causes each slave device, after receiving the synchronization command, to emit an acoustic wave at least partially towards the object when a number of selected transitions of the clock signal after the synchronization command reach a first delay setting, of the set of first delay settings corresponding to an appropriate slave device, indicated by the first delay setting information.

14. The system of claim 13, wherein at least one of the plurality of slave devices comprises an oscillator circuit configured to generate an oscillator signal having an oscillator frequency higher than a clock frequency of the clock signal, and wherein the master device is configured to:
transmit second delay setting information to the at least one slave device via the communication link, wherein the second delay setting information comprises a second delay settings for the at least one slave device that causes the at least one slave device, after receiving the synchronization command, to emit an acoustic wave at least partially towards the object when the number of selected transitions of the clock signal after the synchronization command reach the first delay setting indicated by the first delay setting information and a number of selected transitions of the oscillation signal reach a second delay setting indicated by the second delay setting information.

15. The system of claim 11, wherein the master device is configured to:
pause the clock signal after transmitting the synchronization command;
receive an in-band interrupt over the single data line from one of the plurality of slave devices;
transmit a request to the one of the plurality of slave devices to read the information about the elapsed time from the one of the plurality of slave devices;
receive, in response to the request, the information about the elapsed time from the one of the plurality of slave devices.

16. A method comprising:
- detecting a reflected acoustic wave reflected from an object using an acoustic transducer forming part of a slave device, wherein the slave device is configured to receive a clock signal and a synchronization command over a communication link, and wherein the communication link comprises a single clock line that carries the clock signal and a single data line that carries the synchronization command;
- generating information about an elapsed time between the synchronization command and the detected reflected acoustic wave based, at least in part, on a number of selected transitions of the clock signal between the synchronization command and the detected reflected acoustic wave, and
- transmitting the information about the elapsed time over the single data line to a master device coupled to the communication link.

17. The method of claim 16, wherein the slave device comprises an oscillator circuit configured to generate an oscillator signal having an oscillator frequency higher than a clock frequency of the clock signal, the method further comprising:
- counting a number of selected transitions of the oscillator signal occurring after the detected reflected acoustic wave is detected at the slave device; and
- generating the information about the elapsed time based, at least in part, on the number of selected transitions of the oscillator signal.

18. The method of claim 16, wherein the slave device comprises an oscillator circuit configured to generate an oscillator signal having an oscillator frequency higher than a clock frequency of the clock signal, the method further comprising:
- receiving a first delay setting information and a second delay setting information via the communication link;
- generating the oscillator signal using the oscillator circuit;
- tracking a first number of selected transitions of the clock signal after the synchronization command and a second number of selected transitions of the oscillator signal that occur after the first number of selected transitions of the clock signal reach a first delay setting indicated by the first delay setting information; and
- generating an emitted acoustic wave responsive to the second number of selected transitions of the oscillator signal reaching a second delay setting indicated by the second delay setting information.

19. The method of claim 16, further comprising:
- generating an in-band interrupt over the single data line in response to the detected reflected acoustic wave;
- receiving a request for reading the information about the elapsed time; and
- transmitting the information about the elapsed time to the master device.

20. The method of claim 16, further comprising:
- deriving an event time corresponding to when the reflected acoustic wave was detected at the slave device based on the information about the elapsed time.

* * * * *